United States Patent
Gulati

(10) Patent No.: US 10,496,811 B2
(45) Date of Patent: Dec. 3, 2019

(54) COUNTERFEIT PREVENTION

(71) Applicant: Data I/O Corporation, Redmond, WA (US)

(72) Inventor: Rajeev Gulati, Sammamish, WA (US)

(73) Assignee: Data I/O Corporation, Redmond, WA (US)

(*) Notice: Subject to any disclaimer, the term of this patent is extended or adjusted under 35 U.S.C. 154(b) by 0 days.

(21) Appl. No.: 15/668,682

(22) Filed: Aug. 3, 2017

(65) Prior Publication Data

US 2018/0041341 A1 Feb. 8, 2018

Related U.S. Application Data

(60) Provisional application No. 62/371,184, filed on Aug. 4, 2016.

(51) Int. Cl.
| | |
|---|---|
| *G06F 21/44* | (2013.01) |
| *H04L 9/32* | (2006.01) |
| *H04L 9/08* | (2006.01) |
| *H04L 9/30* | (2006.01) |

(52) U.S. Cl.
CPC ............ *G06F 21/44* (2013.01); *H04L 9/0866* (2013.01); *H04L 9/0877* (2013.01); *H04L 9/0891* (2013.01); *H04L 9/0894* (2013.01); *H04L 9/30* (2013.01); *H04L 9/3234* (2013.01); *H04L 9/3236* (2013.01); *H04L 9/3263* (2013.01); *H04L 9/3278* (2013.01); *H04L 2209/12* (2013.01)

(58) Field of Classification Search
CPC ............................... G06F 21/44; H04L 9/3278
See application file for complete search history.

(56) References Cited

U.S. PATENT DOCUMENTS

| | | | | |
|---|---|---|---|---|
| 5,434,870 A | * | 7/1995 | Benton | G06F 11/006 714/752 |
| 7,845,016 B2 | * | 11/2010 | Diab | H04L 9/3236 713/176 |
| 8,875,280 B2 | * | 10/2014 | Dang | G06F 21/00 726/17 |
| 9,148,286 B2 | * | 9/2015 | Li | G06F 21/31 |
| 9,678,896 B2 | * | 6/2017 | O'Loughlin | G06F 21/57 |
| 2003/0218066 A1 | * | 11/2003 | Fernandes | G06K 7/084 235/449 |

(Continued)

FOREIGN PATENT DOCUMENTS

EP 2385679 11/2011

OTHER PUBLICATIONS

Tehranipoor, M.M., Guin, U. and Forte, D., 2015. Counterfeit integrated circuits. In Counterfeit Integrated Circuits (pp. 15-36). Springer International Publishing. (Year: 2015).*

(Continued)

*Primary Examiner* — James R Turchen
(74) *Attorney, Agent, or Firm* — Wong & Rees LLP; Kirk D. Wong

(57) ABSTRACT

An identification token of a programmable device is determined whether to be invalid. In response to determining that the identification token is invalid, the programmable device is identified as unauthorized. A parameter associated with the unauthorized programmable device is reported to a programming unit.

20 Claims, 14 Drawing Sheets

(56) References Cited

U.S. PATENT DOCUMENTS

| | | | |
|---|---|---|---|
| 2006/0136751 A1* | 6/2006 | Bonaccio | G06F 12/1433 713/194 |
| 2007/0011407 A1* | 1/2007 | Kuehl | G06F 11/2284 711/141 |
| 2007/0152703 A1* | 7/2007 | Brown | G06F 21/73 326/8 |
| 2008/0024268 A1* | 1/2008 | Wong | G06F 21/72 340/5.8 |
| 2008/0091605 A1* | 4/2008 | Hughes | G06F 21/31 705/51 |
| 2008/0267408 A1* | 10/2008 | Hsieh | H04L 9/3271 380/278 |
| 2008/0282209 A1* | 11/2008 | Anderson | G06F 21/73 716/106 |
| 2010/0064379 A1* | 3/2010 | Cassett | H04L 63/14 726/34 |
| 2010/0100746 A1 | 4/2010 | Grove et al. | |
| 2010/0205448 A1 | 8/2010 | Tarhan et al. | |
| 2011/0001603 A1 | 1/2011 | Willis | |
| 2011/0316614 A1* | 12/2011 | Henry | H01H 85/0241 327/525 |
| 2012/0051490 A1* | 3/2012 | Hussain | G06F 21/86 377/15 |
| 2012/0072735 A1* | 3/2012 | Fukawa | G06F 21/62 713/189 |
| 2012/0102334 A1* | 4/2012 | O'Loughlin | G06F 21/57 713/189 |
| 2012/0179614 A1* | 7/2012 | Tang | G06Q 30/0185 705/318 |
| 2013/0047272 A1* | 2/2013 | Kothari | H03K 3/0315 726/34 |
| 2013/0125204 A1* | 5/2013 | La Fever | G06F 21/44 726/2 |
| 2014/0101063 A1* | 4/2014 | Paul | G06Q 30/0185 705/318 |
| 2014/0108786 A1* | 4/2014 | Kreft | G06F 21/71 713/156 |
| 2015/0012737 A1* | 1/2015 | Newell | G06F 21/575 713/2 |
| 2015/0207624 A1* | 7/2015 | Laver | H04L 9/0894 713/2 |
| 2016/0006750 A1 | 1/2016 | Yang | |
| 2016/0282394 A1* | 9/2016 | House | G06K 9/6276 |
| 2016/0380769 A1* | 12/2016 | Bar | H04L 9/30 713/193 |
| 2017/0048070 A1* | 2/2017 | Gulati | H04L 9/3268 |
| 2017/0140146 A1* | 5/2017 | Mehta | G06F 21/45 |
| 2017/0235939 A1* | 8/2017 | Caporale | B41J 29/02 726/2 |
| 2017/0262860 A1* | 9/2017 | Teplinsky | G06Q 30/0185 |
| 2017/0364685 A1* | 12/2017 | Shah | G06F 21/53 |

OTHER PUBLICATIONS

Tehranipoor, M.M., Guin, U. and Forte, D., 2015. Counterfeit integrated circuits. In Counterfeit Integrated Circuits (pp. 15-36). Springer, Cham. (Year: 2015).*

World Intellectual Property Organization, Application No. PCT/US17/45619, International Search Report dated Nov. 17, 2017.

World Intellectual Property Organization, Application No. PCT/US17/45619, Pending Claims as of Nov. 17, 2017.

* cited by examiner

COUNTERFEIT PREVENTION

PRIORITY CLAIM

This application claims benefit under 35 U.S.C. § 119(e) of Provisional Application Ser. No. 62/371,184, entitled COUNTERFEIT PREVENTION, filed Aug. 4, 2016, the entire contents of which are hereby incorporated by reference as if fully set forth herein.

CROSS-REFERENCE TO RELATED APPLICATIONS

This application is related to Provisional Application Ser. No. 62/372,242, entitled EMBEDDING FOUNDATIONAL ROOT OF TRUST USING SECURITY ALGORITHMS, filed Aug. 8, 2016, Provisional Application Ser. No. 62/401,953, entitled UNIFIED PROGRAMMING ENVIRONMENT FOR PROGRAMMABLE DEVICES, filed Sep. 30, 2016, and Non-Provisional Application Ser. No. 15/640,438, entitled DEVICE PROGRAMMING WITH SYSTEM GENERATION, filed Jun. 30, 2017, each of which is owned by Applicant and is incorporated herein in its entirety by this reference thereto.

TECHNICAL FIELD

Embodiments relate generally to device programming systems, and, more specifically, to secure programming systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain operations of electronic circuit board assembly are performed away from the main production assembly lines. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Customizable devices such as Flash memories (Flash), electrically erasable programmable read only memories (EEPROM), programmable logic devices (PLDs), field programmable gate arrays (FPGAs), and microcontrollers incorporating non-volatile memory elements, can be configured with separate programming equipment, which is often located in a separate area from the circuit board assembly lines. In addition, system level components, such as smart phones, circuit boards, Internet of Things (IoT) devices, media players, can also require specific security configuration support.

The systems and sub-assemblies that are manufactured or assembled in bulk on a manufacturing line are generally functionally identical. Such products share similar problems in regards to functionality and operation. Issues manifesting in one device are typically found in all similarly manufactured devices.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
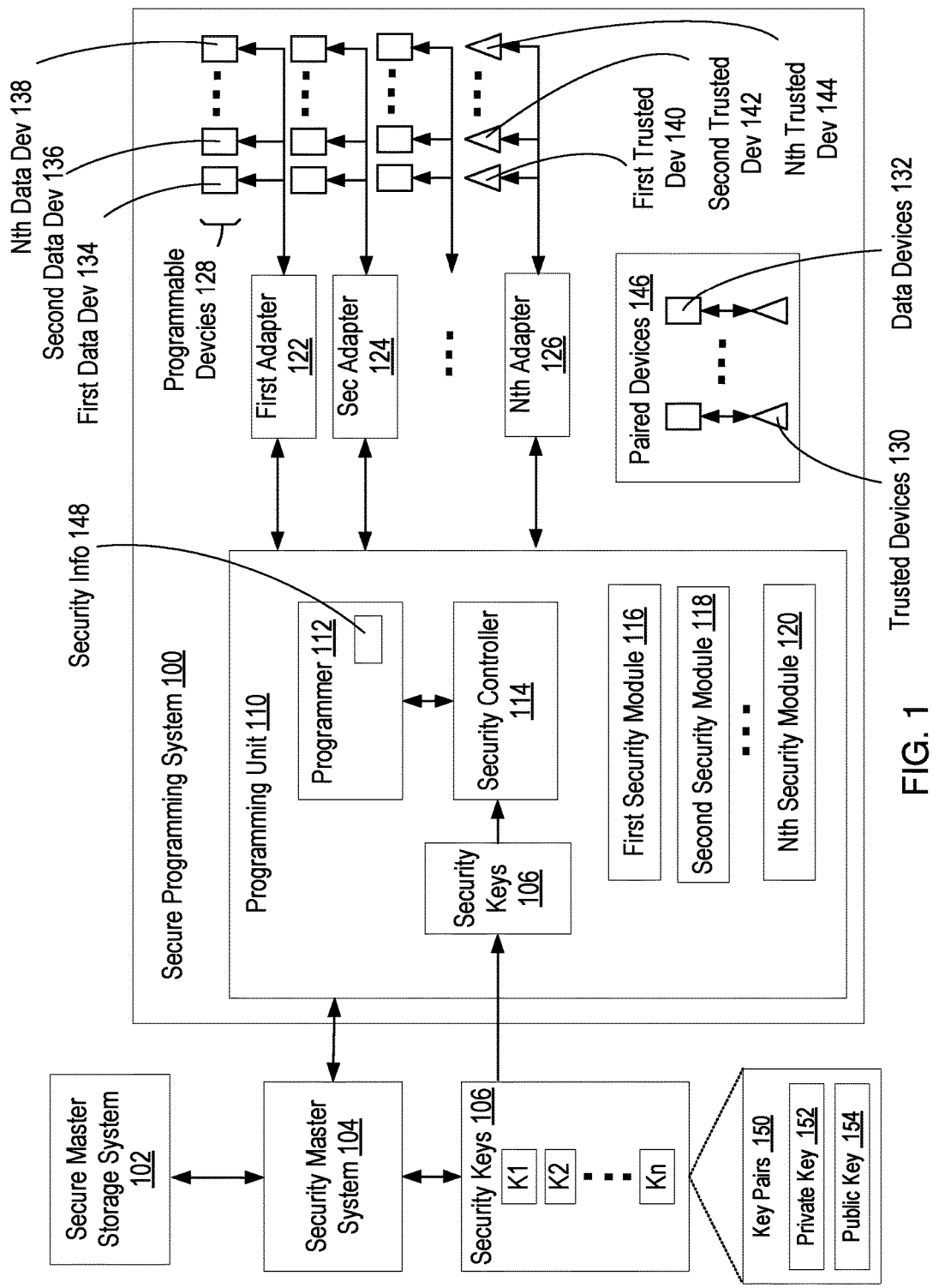
FIG. 1 depicts an illustrative view of a secure programming system, according to an embodiment.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Embodiments are described herein according to the following outline:

1.0. General Overview
2.0. Structural Overview
3.0. Functional Overview
4.0. Example Embodiments
5.0. Implementation Mechanism-Hardware Overview
6.0. Extensions and Alternatives 1.0. General Overview Approaches, techniques, and mechanisms are disclosed for provisioning programmable devices in a secure manner. The secure programming system can individually encrypt a target payload of data and code and then program the information into each individual one of the programmable devices. The secure programming system can create a customized payload package that can only be decrypted by a system or device having the correct security keys.

The programmable devices can include memory chips, circuit boards, and complete electronic devices such as smart phones, media players, or other consumer and industrial electronic devices. The configuration of the security keys can control the operation of the programmable devices.

The secure programming system can securely configure individual devices including components, circuit boards, and complete products. By implementing security features at the individual component manufacturing time, operation can be controlled on a device by device basis. The secure content, codes, and keys can interoperate to provide a high degree of security and control.

According to one embodiment, by individually encrypting a target payload on one of the programmable devices, such as a circuit board, then the circuit board can be configured to only work with components that have registered security codes. This can be used to ensure that circuit boards can only be operated with certain category parts. This provides the manufacturer with a degree of control over the final use of the boards.

According to another embodiment, the programmable devices can validate a serial number or other parameter as a prerequisite for operation of the device. In yet another embodiment, the programmable device can provide code signing facilities to authenticate code before execution.

According to another embodiment, when security codes are verified as invalid, programmable devices are not authorized to operate, e.g., to receive programming data or code or to send any user data back to a host system or a server, etc. Detection of such unauthorized operations eliminates counterfeit devices and secure devices that may be tampered or compromised.

According to another embodiment, identifications (e.g., serial numbers) of unauthorized devices may be reported and saved for subsequent authentication processes. The stored identifications may be used as a priori information for subsequent authentication reduce an overall verification time of identifications.

According to another embodiment, the programmable devices can be authenticated before programming and authenticated again after programming a target payload. This can include authenticating a silicon vendor device certificate and an original equipment manufacturer (OEM) device certificate. The programmable devices can include security information identifying the silicon vendor, the OEM, the factory used to program the devices, the programmer, and other identifying information that can be used to track and authenticate the production of the programmable devices.

In other aspects, embodiments of the invention encompass computer apparatuses and computer-readable media configured to carry out the foregoing techniques.

2.0. Structural Overview

Referring now to FIG. 1, therein is shown an illustrative view of various aspects of a secure programming system 100 in which the techniques described herein may be practiced, according to an embodiment. The secure programming system 100 can individually configure data devices and active, trusted device with cryptographic information to provide a secure programming and operation environment.

The secure programming system 100 comprises a programming unit 110 having a programmer 112, a security controller 114, security keys 106, adapters for coupling to programmable devices, a first security module 116, a second security module 118, and an nth security module 120. The secure programming system 100 can be coupled to a security master system 104 having a secure master storage system 102. The security master system 104 and the secure master storage system 102 can generate and securely storage the security keys 106 for encrypting and decrypting information.

In an embodiment, security master system 104 can be embodied by hardware (HW) including, but is not limited to, a trusted security module (TPM), a hardware security module (HSM), or a security chip, or simulated in software (SW) including, but is not limited to, Soft TPM or Soft HSM.

In an embodiment, security master system 104 can be architected to support manufacturing of devices for multiple OEM's on the same Programming system. This may involve firewalling security key material belonging to an OEM so that there is no mixing of device keys or signature keys across OEM's or across different products from the same OEM.

In an embodiment, programming methods can include, but are not limited to, pre-programming (or socketed programming), in-system/in-circuit programming, etc. to provision-devices.

In an embodiment, an HSM can be in a cloud or a network attached to programmer 112.

In an embodiment, a TPM or a security chip can be on a host personal computer (PC) of programmer 112. The host PC can also be attached to programmer 112 through wired or wireless networks.

In an embodiment, a TPM or a security chip can be in programming unit 110.

The security keys 106 can implement a variety of security paradigms. For example, the security keys 106 can include key pairs 150 having a private key 152 and a public key 154. The key pairs 150 can be used to implement a public key cryptography system where data encrypted by the public key 154 can be decrypted using the private key 152. The secure programming system 100 can include as many different key pairs 150 as necessary. The key pairs 150, the private key 152, and the public key 154 can be implemented for different devices or system elements including the secure programming system 100, the programming unit 110, the programmer 112, the security controller 114, the security modules, the programmable devices 128, the data devices 132, the trusted devices 130, or any other system element.

System 100 comprises one or more computing devices. These one or more computing devices comprise any combination of hardware and software configured to implement the various logical components described herein, including components of the programming unit 110 having the programmer 112, the security controller 114, the adapters, the first security module 116, the second security module 118, and the nth security module 120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The programming unit 110 can be a secure system for programming data, metadata, and code onto the programmable devices 128. The programming unit 110 can receive security information from the security master system 104, process the information, and transfer an individually configured version of the security information to the programmable devices 128.

The programming unit 110 can include the programmer 112. The programmer 112 can be an electromechanical system for physically programming the programmable devices 128. For example, the programmer 112 can receive a tray containing the programmable devices 128, electrically couple the programmable devices 128 to an adapter unit, and transfer security information into the programmable devices 128. The programming unit 110 can receive individualized status information from each of the programmable devices 128 and customize the security information transferred to each of the programmable devices 128 on an individual device basis. For example, each of the programmable devices 128 can receive an individual block of information that is different from the information transferred to others of the programmable devices.

The programmer 112 can be coupled to one or more of the adapters that can be used to access the programmable devices 128. The adapters can include a first adapter 122, a second adapter 124, and a nth adapter 126.

In an illustrative example, the first adapter 122 can be a hardware device that can be used to electrically connect one or more of the programmable devices to the programmer 112. The programmer 112 can then transfer a version of the security information to one of the programmable devices 128. The first adapter 122 can include one or more sockets for mounting the programmable devices 128. The first adapter 122 can include a socket, a connector, a zero-insertion-force (ZIF) socket, or a similar device to mounting integrated circuits.

Although the adapters are described as electromechanical units for mounting the programmable devices 128, it is understood that the adapters can have other implementations as well. For example, if the programmable devices 128 are independent electronic devices, such as a cell phone, a consumer electronic device, a circuit board, or a similar device with active components, then the adapters can include mechanisms to communicate with the programmable devices 128. The adapters can include a cable link, a Universal Serial Bus link, a serial connection, a parallel connection, a wireless communication link, an electronic data bus interface, an optical interface, or any other communication mechanism.

The programmable devices 128 are devices that can be provisioned with secure information by the programming unit 110. For example, the programmable devices 128 can include data devices such as flash memory units, programmable read only memories, secure data storage devices, or other data storage devices.

Provisioning may include transferring data and/or code information to a device. For example, a flash memory unit can be provisioned by programming it with data.

The programmable devices 128 can also include trusted devices 130 that include security data and security programming information. For example, the programmable devices 128 can include trusted devices 130 such as cell phones, hardware security modules, trusted programming modules, circuit board, or similar devices.

The data devices 132 can include any number of devices, e.g., a first data device 134, a second data device 136, and a nth data device 138. The trusted devices 130 can include any number of trusted devices, e.g., a first trusted device 140, a second trusted device 142, and up to a nth trusted device 144.

The programmable devices 128 can each be provisioned with individually customized security information. Thus, each of the programmable devices 128 can include a separate set of the security keys 106 that can be used to individually encrypt the data stored in programmable devices 128. This provides the ability to encrypt security information 148 differently on each of the programmable devices 128 to maximize security. Each of the programmable devices 128 can be personalized with individual security keys 106.

The programmable devices 128 can be configured to include paired devices 146. The paired devices 146 are two or more of the programmable devices 128 that can share one or more of the security keys 106. This can allow each of the paired devices 146 to detect and authenticate another of the paired devices 146 in the same group. Thus, data from one of the paired devices 146 can be shared with another one of the paired devices 146. This can allow functionality such as sharing information, authenticating a bi-directional secure communication channel between two or more of the paired devices 146, identifying other related devices, or a combination thereof.

In an illustrative example, the secure programming system 100 can be used to establish one of the paired devices 146 having the first data device 134, such as a system information module (SIM) chip, paired with the first trusted device 140, such as a smart phone. In this configuration, the first data device 134 and the first trusted device 140 can both be programmed with the security keys 106 for the paired devices 146. Thus, the first trusted device 140 can validate the security information 148, such as a serial number, of the first data device 134 to authenticate that the first trusted device 140 is allowed to use the other information on the first data device 134.

The programming unit 110 can include a security controller 114 coupled to the programmer 112. The security controller 114 are computing devices for processing security information. The security controller 114 can include specific cryptographic and computational hardware to facility the processing of the cryptographic information. For example, the security controller 114 can include a quantum computer, parallel computing circuitry, field programmable gate arrays (FPGA) configured to process security information, a co-processor, an array logic unit, a microprocessor, or a combination thereof.

The security controller 114 can be a secure device specially configured to prevent unauthorized access to security information at the input, intermediate, or final stages of processing the security information. The security controller 114 can provide a secure execution environment for secure code elements to execute in. For example, the security controller 114 can be an HSM, a microprocessor, a TPM, a dedicated security unit, or a combination thereof. The security controller 114 can be part of the programming unit 110. For example, the security controller 114, such as a hardware security module, can be included within the programmer 112. Also, for example, the security controller 114 can be an on-board device integrated into the programmer 112.

The security controller 114 can be coupled to security modules to provide specific security functionality. The security modules can include a first security module 116, a second security module 118, and a nth security module 120. Each of the security modules can provide a specific security functionality such as identification, authentication, encryption, decryption, validation, code signing, data extraction, or a combination thereof. For example, the security modules can be hardware, software, or a combination thereof.

For example, the first security module 116 can be configured to provide an application programming interface (API) to a standardized set of commonly used security functions. In another example, the second security module 118 can be a combination of dedicated hardware and software to provide faster encryption and decryption of data.

The programming unit 110 can include the secure storage of one or more the security keys 106. The security keys 106 can be calculated internal to the secure programming system 100, can be calculated externally and received by the secure programming system 100, or a combination thereof.

The security keys 106 can be used to encrypt and decrypt the security information. The security keys 106 can be used to implement different security methodologies and protocols. For example, the security keys 106 can be used to implement a public key encryption system. In another example, the security keys 106 can be used to implement a different security protocol or methodology. Although the security keys 106 can be described as used for a public key encryption system, it is understood that the security keys 106 can be used to implement different security paradigms.

One of the advantages of the secure programming system 100 includes the ability to provision each of the programmable devices 128 with a different set of the security keys 106 and a different version of the security information 148 encrypted by the individual security keys 106. This can ensure that the security keys 106 used to decrypt the security information 148 on one of the programmable devices 128 cannot be used to decrypt the security information on another one of the programmable devices 128. Each of the programmable devices 128 can have a separate one of the security keys 106 to provide maximum protection.

Figure 2:
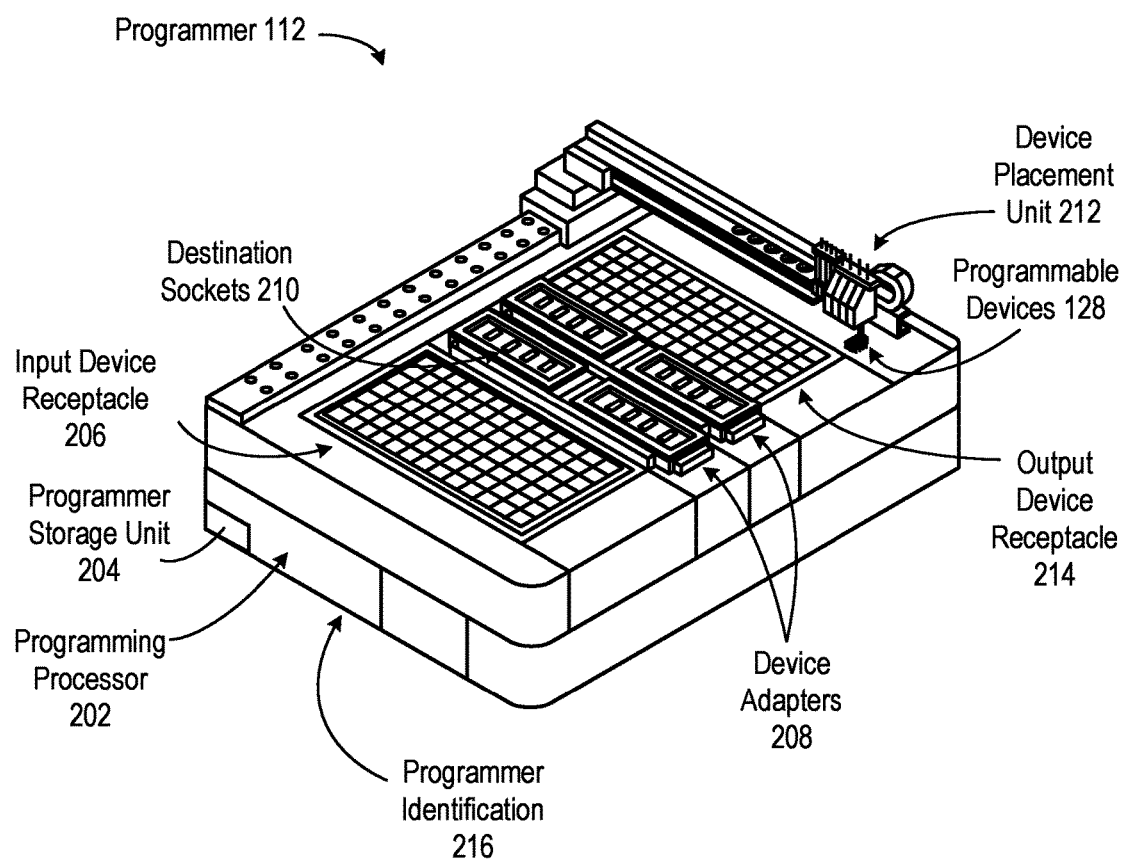
FIG. 2 depicts an example of a programmer.

Referring now to FIG. 2, therein is shown an example of the programmer 112. The programmer 112 is an electromechanical device for provisioning the programmable devices 128.

The programmer 112 can be used to access the programmable devices 128 and provision the programmable devices 128 with the content payload. The content payload can include data, code, security keys 106, the security information 148, and other related content.

The programmer 112 can have a variety of configurations. The programmer 112 can include a programming processor 202, an input device receptacle 206, device adapters 208, destination sockets 210, a device placement unit 212, and an output device receptacle 214. For example, the programmer 112 can be a programmer 112, a chip programmer, a device provisioning system, a circuit board programmer, or a similar provisioning system.

The programmer 112 can have a programmer identification 216. The programmer identification 216 is a unique value for identifying the programmer 112.

The programmer 112 can configure the programmable devices 128 by initializing and writing a data image into the programmable devices 128. The data image can be configured for the device type of the programmable devices 128. The programmer 112 can transfer the data to the programmable devices 128 using direct or indirect memory access.

The programmer 112 can receive a single payload image for the programmable devices 128 and store the image in a local programmer storage unit. The payload image can be processed into individual images targeted for each of the programmable devices 128. Configuring the programmable devices 128 can store memory structure, cryptographic data, and user data on the programmable devices 128. Configuring can include forming one-time structures such as partitions on the programmable devices 128.

The programmer 112 can include the programming processor 202. The programming processor 202 is a computing unit for controlling the programmer 112. The programming processor 202 can include a central processing unit (not shown), a programmer storage unit 204, a communication interface (not shown), and a software (not shown).

The programming processor 202 can have a variety of configurations. For example, the programming processor 202 can include the security controller or be coupled to the system controller. The programming processor 202 can be a single processor, a multiprocessor, a cloud computing element, or a combination thereof.

The programmer storage unit 204 is a device for storing and retrieving information. For example, the programmer storage unit 204 of the programmer 112 can be a disk drive, a solid-state memory, an optical storage device, or a combination thereof.

The programmer 112 can include the software for operating the programmer 204. The software is control information for executing on the programming processor 202. The software can be stored in the programmer storage unit 204 and executed on the programming processor 202.

The programmer 112 can include the input device receptacle 206. The input device receptacle 206 is a source of the programmable devices 128. For example, the input device receptacle 206 can be a tray that conforms to the Joint Electron-device Engineering Council (JEDEC) standards. The input device receptacle 206 can be used for holding unprogrammed devices.

The programmer 112 can include the output device receptacle 214. The output device receptacle 214 is a destination for the programmable devices 128 that have been provisioned. For example, the output device receptacle 214 can be an empty JEDEC tray for holding finished devices, a storage tube, a shipping package, or other similar structure.

The programmer 112 can include the device adapters 208. The device adapters 208 are mechanisms for coupling to the programmable devices 128.

The device adapters 208 can have a variety of configurations. For example, the device adapters 208 can include destination sockets 210 for mounting the programmable devices 128 such as chips. The sockets are mechanisms for holding and interfacing with the programmable devices 128. The device adapters 208 can be modular and removable from the programmer 112 to accommodate different socket configurations. The device adapters 208 can include a latch mechanism (not shown) for attaching to the programmer 112.

The destination sockets 210 can hold the programmable devices 128. The destination sockets 210 can be used to read or write new information to the programmable devices 128.

The programmer 112 can include the device placement unit 212. The device placement unit 212 is a mechanism for positioning the programmable devices 128 in one of the destination sockets 210.

The device placement unit 212 can be implemented in a variety of ways. For example, the device placement unit 212 can be a robotic arm, a pick and place mechanism, or a combination thereof. Although the device placement unit 212 can be described as a rail-based positioning system, it is understood that any system capable of positioning one of the programmable devices 128 in the destination sockets 210 can be used.

The device placement unit 212 can retrieve one or more of the programmable devices 128 that are blank from the input device receptacle 206. The device placement unit 212 can transfer the programmable devices 128 to the destination sockets 210 of the device adapters 208.

Once the programmable devices 128 are engaged and secured by the device adapters 208, the device programming process can begin. The programmer 112 can program a local copy of the information into the programmable devices 128 in one of the destination sockets 210. For example, the local copy of the programming information can be in a preprogrammed master device, from a file in local storage, or from a remote server.

Once programming is complete, the device placement unit 212 can transport the programmable devices 128 that have been programmed to the output device receptacle 214.

The device placement unit 212 can transports any of the programmable devices 128 that have errors to a reject bin (not shown).

The programmer 112 can include a programmer identification 216. The programmer identification 216 is a unique value for the programmer 112. The programmer identification 216 can be used to identify the programmer 112. The programmer identification 216 can be incorporated into a device identification of each of the programmable devices 128 to indicate which programmer 112 was used to program the devices.

Figure 3:
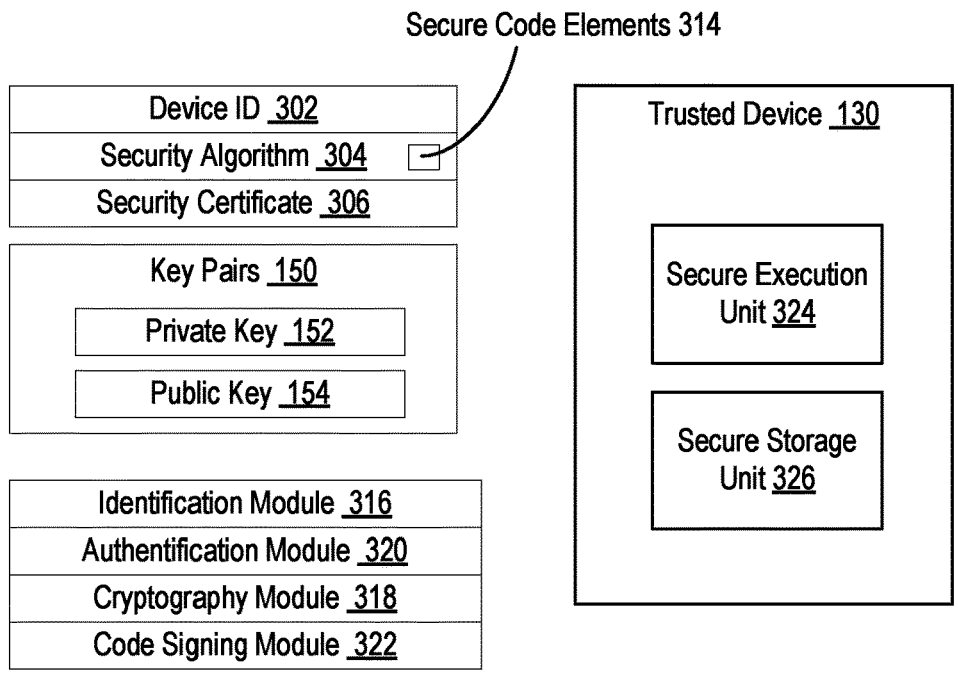
FIG. 3 depicts an example of a trusted device.

Referring now to FIG. 3, therein is shown an example of one of the trusted devices 130. The trusted devices 130 are components having the secure storage unit 326 and the secure execution unit 324. The trusted devices 130 are active components capable of executing secure code in the secure execution unit 324 to perform operations on the secure data in the secure storage unit 326.

The trusted devices 130 can be provisioned by the secure programming system 100 to include security information. For example, the trusted devices 130 can include the device identification 302, security algorithms 304, a security certificate 306 and the key pairs 150 each having the private key 152 and the public key 154.

In an illustrative example, the security keys 106 can comprise one or more of the key pairs 150 for a public key encryption system. The security information can be encrypted with the public key 154 of one of the key pairs 150 and decrypted using the private key 152. However, it is understood that the system can take advantage of different security paradigms including symmetric encryption, asymmetric encryption, data encryption standard (DES), hash codes, PGP, or other cryptographic systems. In a further example, the key pairs 150 can be used to provide a digital signature using two different sets of the security keys 106. In the digital signature example, a message or payload can be encrypted using the private key 152 of a first element and the public key 154 of a second element. The resulting encrypted message can be decrypted using the public key 154 of the first element and the private key 152 of the second element. If the message is successfully decrypted, then it shows that the message was encrypted by the first element thus established the digital signature.

The device identification 302 is a data value that can uniquely identify each of the trusted devices 130 individually. For example, the device identification 302 can include serial numbers, markers, security codes, or a combination thereof.

The security algorithms 304 are secure code elements 314. The security algorithms 304 can provide an application programming interface to external systems to control security functionality on the trusted devices 130. The security algorithms 304 can be customized to each of the trusted devices 130. For example, the security algorithms 304 can include the code elements 314 such as source code, executable code, a library module, a link module, configuration files, initialization data, hardware control codes, or a combination thereof.

The security certificate 306 is a security object associated with one of the trusted devices 130. The security certificate 306 can be pre-programmed to certify that a device has a particular root of trust embedded in it. The security certificate 306 can have one or more of the public key 154 in them. The security certificate 306 can include security data such as key pairs 150, security keys 106, encrypted passwords, or a combination thereof.

The security certificate 306 can be a securely stored data element. For example, the security certificate 306 can be encrypted security information that must be decrypted before use.

The key pairs 150 can be security elements having two or more separate security keys used to encrypt and decrypt data. For example, the key pairs 150 can include the private key 152 and the public key 154. The security information encrypted with the public key 154 can be decrypted using the private key 152.

The key pairs 150 can be implemented in a variety of ways. For example, the key pairs 150 can be configured to have different key lengths to change the level of security. The private key 152 and the public key 154 can be implemented with the same or different character lengths.

Although the key pairs 150 are described in the context of a public key encryption system, it is understood that the key pairs 150 can also be used to implement other encryption paradigms. For example, the key pairs 150 can be used for symmetric encryption, asymmetric encryption, standards based encryption, hashing algorithms, or any other encryption system.

The trusted devices 130 can include security functionality implemented as security modules. For example, the trusted devices 130 can include an identification module 316, an authentication module 320, a cryptography module 318, and a code signing module 322.

The identification module 316 can verify the identification of one of the programmable devices 128. The identification module 316 can receive the device identification 302 of one of the programmable devices 128 and determine if the device identification 302 is correct. For example, the device identification 320 can be compared to a list of known devices, compared against a checksum, compared using a computational algorithm, or similar techniques.

The authentication module 320 can authenticate one or more of the properties of one of the programmable devices 128. The authentication module 320 can receive the device identification 302, the security parameters including one or more of the security keys 106 to determine if the security parameter provided is valid. The authentication module 320 can also be used to validate the device identification 302.

The validity of the security parameter can be determined in a variety of ways. For example, the validity of the security parameter can be validated by successfully decoding the security parameter using one of the security keys available to one of the trusted devices 130. In another example, the validity of the security parameters can be validated by decrypting one of the security parameters and comparing it to a predefined value stored within one of the trusted devices 130.

The cryptography module 318 is a unit for performing cryptographic operations. The cryptography module 318 can provide an interface to perform computationally intensive operations such as encryption and decryption. The other security modules can be coupled with the cryptography module 318 to provide security functionality.

The cryptography module 318 can be implemented in a variety of ways. For example, the cryptography module 318 can include hardware, software, or a combination thereof. The cryptography module 318 can provide a standardized interface to allow the other security modules to perform the required cryptographic functions.

The code signing module 322 is a unit for securing code elements 314. The code signing module 322 can encrypt code elements, decrypt code elements, and control the execution of the code elements. The code signing module 322 can be used to ensure that one of the code elements 314 can be executed on one of the trusted devices 130 by verifying that the security information associated with the code element 314.

In an illustrative example, each of the code elements 314 can include an execution parameter that indicates the model number of the trusted devices 130 where the code elements 314 are authorized to execute. The code signing module 322 can be used to validate the execution parameter, compare the parameter to the model number information in one of the trusted devices 130, and only allow execution of the code elements 314 if the two values match. This could be used to limit operation of the code element 314 to a particular high end phone or other specific device.

One of the advantages of the trusted devices 130 is that the trusted devices 130 can identify and authenticate the security information internally to increase the level of security. The trusted devices 130 can validate the security information using the security keys 106 stored in the secure storage unit 326.

The trusted devices 130 can provide a measure of trust when the trusted devices 130 are secure. The trusted devices 130 can have a variety of configurations. For example, the trusted devices 130 can have a system identification, an authentication mechanism, encryption and decryption functionality, code signing to protect executables, trusted storage, and a trusted execution environment.

The system identification can include elements that identify or describe hardware and software components. The trusted devices 130 can have the ability to securely authenticate its identity and other properties. The trusted devices must be able to securely encrypt and decrypt information. The trusted devices 130 must be able to authenticate trusted code. The trusted devices must have secure storage and execution capability.

The secure programming system 100 must be able to implement a system of roots of trust. The roots of trust (RoT) are a set of functions in a trusted computing environment that are always trusted by the system. For example, the roots of trust can serve as a separate secure compute engine controlling the trusted computing platform cryptographic process. Alternatively, devices can implement the roots of trust as hardware and software components that are inherently trusted. They are secure by design and can be implemented in hardware or protected by hardware. They can be used to perform security critical functions such as measuring or verifying software, protecting cryptographic keys, and performing device authentication.

The roots of trust can provide a variety of security functionality including: on the fly encryption, detection and reporting of tampering with secure data, detection of active tampering attempts, digital rights management, and other security functions.

Implementing secure operation in a mobile hardware space is difficult because of the higher risk resulting from physical access to the devices. Such secure devices require the hardware to work closely with protected data and software to insure secure operation.

Figure 4:
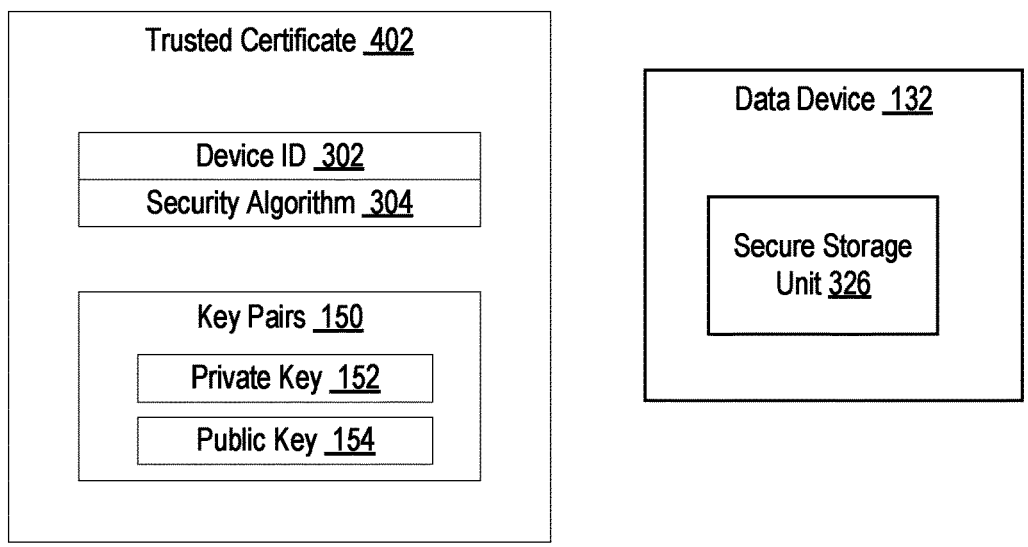
FIG. 4 depicts an example of a data device.

Referring now to FIG. 4, therein is shown an example of one of the data devices 132. The data devices 132 are components having the secure storage unit 326. The data devices 132 are passive components capable storing the secure data in the secure storage unit 326 and providing access to the stored data when accessed by one of the trusted devices 130.

The data devices 132 can be provisioned by the secure programming system 100 to include security information. For example, the data devices 132 can include the device identification 302, the security algorithms 304, the security certificate 306, and the key pairs 150 each having the private key 152 and the public key 154. In this case, the data within the secure storage unit 326 may be internally accessed from within the data devices 132.

The secure storage unit 326 can be used as a write once data area. Information can be programmed into the secure storage unit 326 and then the secure storage unit 326 can be processed to eliminate the access to the data within the secure storage unit 326 from outside the data devices 132.

In an illustrative example, one of the data devices 132 can be a flash memory device. Within the flash memory device, the flash memory can be partitioned into different blocks. Some of the blocks can be used to provide general memory space. Some of the other blocks may be configured to be private and used to store information that is not accessible from outside the flash memory drive. A private block can be used to form the secure storage unit 326.

In another example, the secure storage unit 326 can be a dedicated memory area on one of the data devices 132 that is protected by a security fuse. The data can be written to the secure storage unit 326 and then external access can be eliminated by blowing the security fuse.

Each of the data devices 132 can include a trusted certificate 402. The trusted certificate 402 is a data structure that can include other security parameters. For example, the trusted certificate 402 can include the device identification 302, the security algorithms 304, and the key pairs 150.

Figure 5:
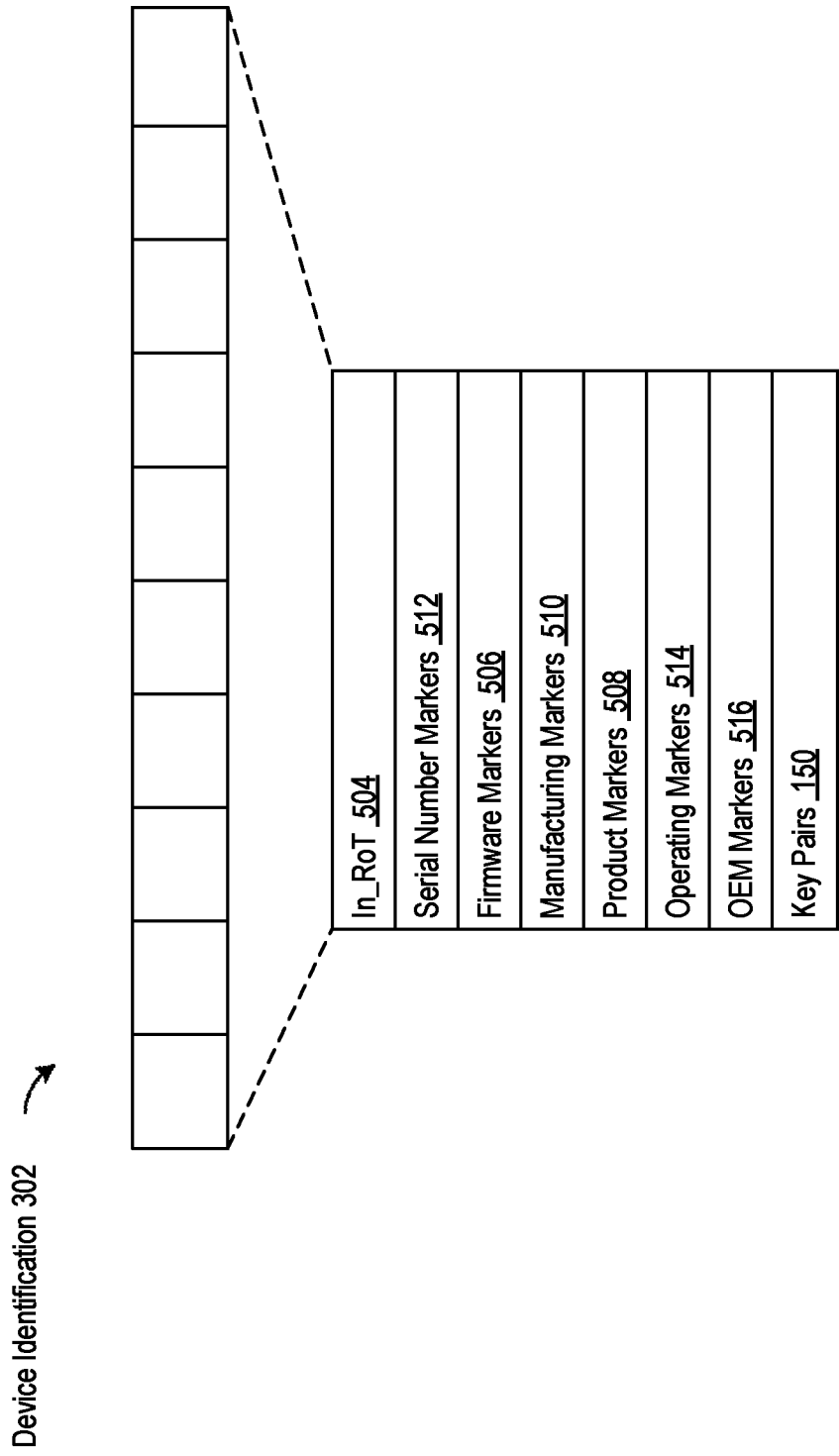
FIG. 5 depicts an example of a device identification.

Referring now to FIG. 5, therein is shown an example of the device identification 302. The device identification 302 is a data structure that can be used to uniquely identify one of the programmable devices 128, the secure programming system 100, the programmer 112, or a combination thereof. The device identification 302 can be used to describe the programmable devices 128 including the data devices 132 and the trusted devices 130.

The device identification 302 can have a variety of configurations. For example, the device identification 302 can include an incoming root of trust 504, serial number markers 512, firmware markers 506, manufacturing markers 510, product markers 508, operating markers 514, original equipment manufacturer markers 516 (OEM markers), the key pairs 150, or similar markers.

The incoming root of trust 504 is a security element. The incoming root of trust 504 can be programmed into one of the programmable devices 128 at manufacture or programming time. For example, the incoming root of trust 504 can be a serial number and a key value. In another example, the incoming root of trust 504 can be an embedded identifier, such as a device identifier implanted at silicon creation time in one of the programmable devices 128.

The serial number markers 512 are security elements that can include a serial number for one of the programmable devices 128. The device identification 302 can include one or more of the serial number markers 512.

The firmware markers 506 are security elements that can describe or identify the firmware used in one of the programmable devices 128. The firmware markers 506 can include a version number, a calculated checksum value, a partial or complete hash value, a text string identifier, a numeric identifier, or a combination thereof. For example, one of the programmable devices 128 can be a circuit board having firmware installed on the board. The firmware markers 506 can identify the version number for each separate firmware element. The firmware version information could be used to coordinate interoperability between code elements 314 in the programmable devices 128. In another example, the firmware markers 506 can include a calculated hash checksum, such as a MD5 hash or fingerprint. The hash checksum can be used to verify the data integrity of the firmware by comparing the hash checksum against a hash calculated against the live version of the firmware. Any difference would indicate that the firmware has been modified.

The manufacturing markers 510 are security identifiers that can describe one or more manufacturing properties. For example, one of the programmable devices 128 can include the manufacturing markers 510 such as location information, programmer identification, programming unit identification, manufacturing time information, manufacturing location information, time windows, manufacturing execution system identification information, factory identification, vendor identification, manufacturing equipment information, or manufacturing related parameters.

The product markers 508 are security elements that can describe the products used with the programmable devices 128. The product markers 508 can include related manufacturers, branding information, product line information, model information, or other product related parameters.

The operating markers 514 are security elements that can describe the operating properties for the programmable devices 128. The operating markers 514 can include operating voltage, voltage patterns, current levels, power draw, heating factors, critical operating frequencies, operating sequence information, or operating parameters.

The OEM markers 516 are security elements that can describe the original equipment manufacturers or related contract manufacturers who can use the programmable devices 128. The OEM markers 516 can include manufacturer identification 518, license information, time windows, authorized locations, authorized factories, product lot size, serial number ranges, or other OEM related parameters.

The device identification 302 is a multi-variable data structure that includes security information for the programmable devices 128. The data elements of the device identification 302 can be individually encrypted within the device identification 302. The device identification 302 itself can be encrypted. The device identification 302 can be specific to each one of the programmable devices 128 both in terms of the data elements forming the device identification 302 and the degree of encryption and other security mechanisms used to protect the device identification 302 itself.

One of many advantages of the device identification 302 is the enablement of access to specific data elements within the device identification 302 by decrypting only the elements required. By encrypting both the device identification 302 and the individual data elements, a finer granularity of security can be provided.

Figure 6:
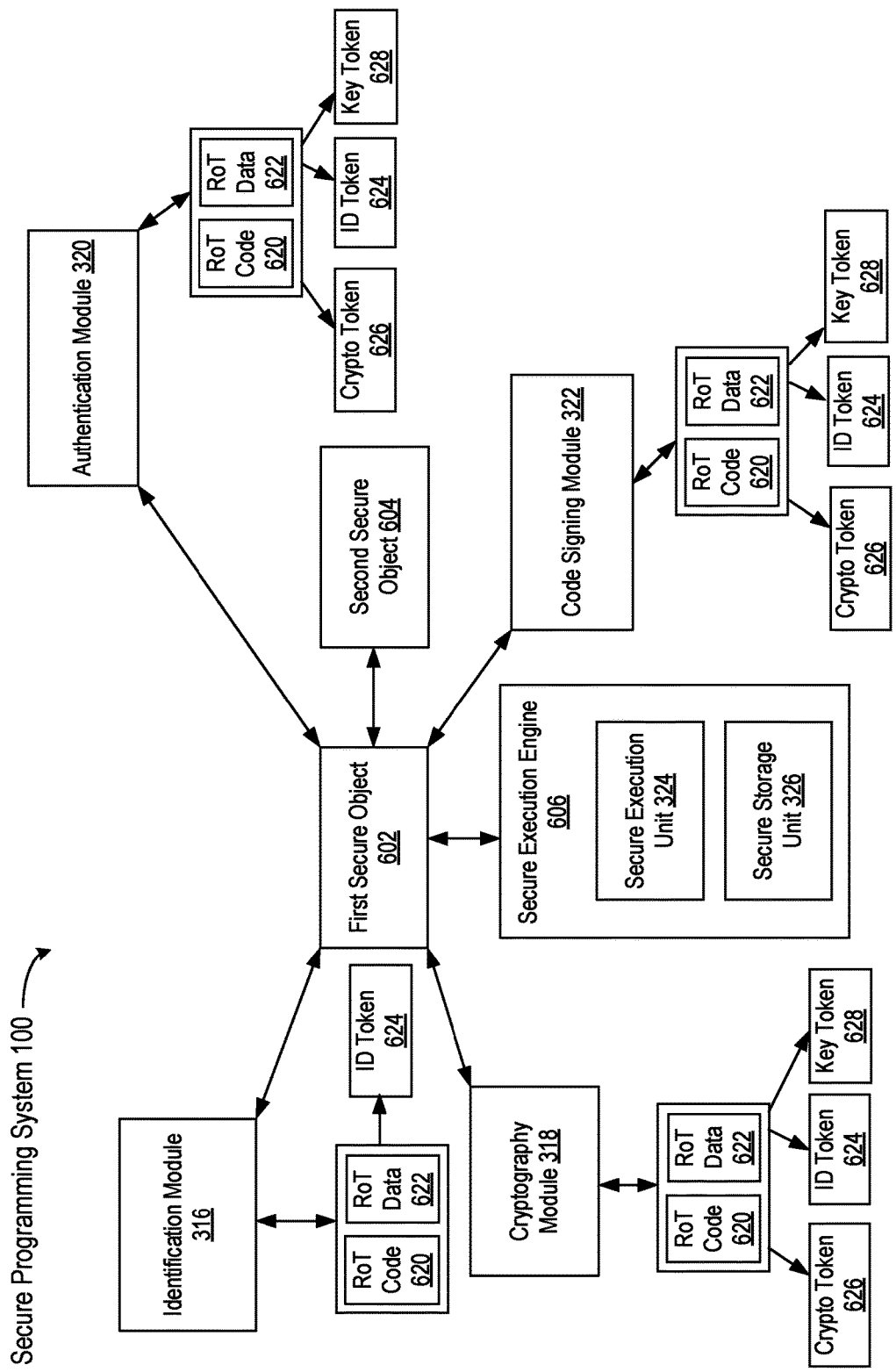
FIG. 6 depicts an example block diagram of a secure programming system.

Referring now to FIG. 6, therein is shown an example block diagram of the secure programming system 100. The secure programming system 100 includes several secure objects, such as a first secure object 602 and a second secure object 604. The first secure object 602 may interface or communicate with the second secure object 604.

The secure objects represent any hardware or software objects having security mechanisms or protocols for protection from unauthorized interception or duplication. For example, the secure objects may include, but is not limited to, one of the data devices 132, one of the trusted devices 134, an electronic component, an electronic device, a boot loader, a firmware (FW), an operating system (OS), a software application, a hardware programmer, a peripheral device, a website, a machine, etc.

The first secure object 602 may interface with the identification module 316, the authentication module 320, the cryptography module 318, and the code signing module 322. For illustrative purposes, although the second secure object 604 is shown connected only with the first secure object 602, the second secure object 604 may also be connected with any combination of the identification module 316, the cryptography module 318, the authentication module 320, the code signing module 322. The first secure object 602 or the second secure object 604 is protected from security breach using, but is not limited to, a combination of the identification module 316, the cryptography module 318, the authentication module 320, the code signing module 322, any other units, modules, or functions of the secure programming system 100.

The identification module 316 generates an identity of a secure object to protect the secure object from an unauthorized access to the secure object. The identification module 316 extracts identification tokens 624 (ID tokens). The ID tokens 624 include information that is employed to verify an identity before access to a secure object is granted. The ID tokens 624 may include, but are not limited to, a user identification, a serial number of a device, a device identification, etc.

The ID tokens 624 may be extracted by the identification module 316 using any secure information or mechanism, including, but not limited to, a root of trust code 620 (RoT code) and a root of trust data 622 (RoT data). For example, the RoT data 622 may represent information associated with a digital birth certificate of a device.

The term root of trust (RoT) referred to herein refers to a set of functions in a trusted or secured computing module that includes hardware components, software components, or a combination of hardware and software components. For example, these functions may be implemented in, but are not limited to, a boot firmware, a hardware initialization unit, a cross-checking component/chip, etc. Also, for example, the functions may be implemented using, but is not limited to, a separate compute engine that controls operations of a cryptographic processor.

The ID tokens 624 may be extracted from the RoT data 622 using the RoT code 620. The ID tokens 624 may be cryptographically protected and so may be decrypted only by the RoT code 620. The ID tokens 624 may be unique such that each secure object has its own identification and so none of the secure objects shares its identification with another secure object.

The RoT code 620 includes instructions or commands that are used to decipher data that may be used to identify a source of a device or to decode content. The RoT data 622 includes information that is protected and may only be decoded using the RoT code 620.

The RoT code 620 and RoT data 622 may be provided or generated by any secure mechanisms. For example, the RoT code 620 and RoT data 622 may be programmed into a secure storage unit of a device during programming or configuring the device.

Also, for example, the RoT code 620 and RoT data 622 may be sent from a host server or system to the secure programming system 100 in a secure manner such that only the secure programming system 100, which has been authorized and validated to receive the RoT code 620 and RoT data 622. Further, for example, the host server or system may include the security master system 104 that sends the security keys 106 to the secure programming system 100 for identification or authentication before the secure programming system 100 may be able to receive or decrypt information from the security master system 104.

As an example, the secure storage unit may include, but is not limited to, a one-time programmable memory or any other storage units that are known only to authorized users or devices. As another example, the secure storage unit may include, but is not limited to, a storage or memory that is accessible only with authorized information or identification without which permission would be denied.

For example, the RoT code 620 and RoT data 622 may be preprogrammed into a device, such as the secure objects, at the time when the device is programmed or configured before the device is integrated or operated in a production environment or system. Also, for example, the production environment or system may include, but is not limited to, a portable device, a computer, a server, an electronic circuit board, etc.

The authentication module 320 can be used to verify whether an identification token 624 is authorized for access to a secure object. After the identification module 316 extracts the ID tokens 624, the authentication module 320 verifies the ID tokens 624 to identify whether a secure object is a valid object that may communicate with an authorized system to send or receive secure information. For example, if one of the ID tokens 624 is not valid, the secure object may not be allowed to exchange information with the programmer 112.

After the authentication module 320 verifies that the ID tokens 624 of the secure object is valid, the authentication module 320 may generate a combination of one of the ID tokens 624, a key token 628, and a cryptographic token 626. The key token 628 includes information employed for authentication of the ID tokens 624. The cryptographic token 626 includes information employed for cryptographically encode or decode information for information security or data confidentiality.

In one or more embodiments, the ID tokens 624, the key token 628, or the cryptographic token 626 may be generated from the RoT data 622 using the RoT code 620. In one or more embodiments, the ID tokens 624, the key token 628, or the cryptographic token 626 may be cryptographically protected and so may be decrypted only by the RoT code 620.

The cryptography module 318 can provide data encryption and decryption for secure information exchanged between the secure objects or between a secure object and an external system. The external system that may exchange the secure information with the secure objects may include, but is not limited to, the programmer 112, the security master system 104, a host system, etc.

In one or more embodiments, after the identification module 316 extracts the ID tokens 624 or the authentication module 320 validates the ID tokens 624, the cryptography module 318 may generate the ID tokens 624, the key token 628, and the cryptographic token 626. The cryptographic token 626 may be generated by the cryptography module 318 using the RoT code 620 to decode information from the RoT data 622.

In one or more embodiments, the cryptography module 318 may generate the ID tokens 624 or the key token 628 using the cryptographic token 626 to further decode other information from the RoT data 622. In an embodiment, elimination of a data breach is greatly simplified using the cryptography module 318 having multiple levels of protection that improve information security or data confidentiality.

In one or more embodiments, the cryptography module 318 may include cryptography methods including, but not limited to, symmetric-key cryptography, public-key cryptography, etc. For example, the cryptography module 318 may include a cryptographic method in which both sender and receiver may share the same key or different keys that may be computed using a predetermined algorithm.

As an example, the cryptographic method may include, but is not limited to, block cipher methods, cryptographic hash functions, etc. As another example, the cryptographic method may include, but is not limited to, Data Encryption Standard (DES), Advanced Encryption Standard (AES), triple-DES, MD4 message-digest algorithm, MD5 algorithm, Secure Hash Algorithms 1 and 2, etc.

As an example, the cryptographic method may include, but is not limited to, a public-key or an asymmetric key cryptography in which two different but mathematically related keys may be used—the public key and the private key. As another example, a public key system may be constructed so that calculation of one key (e.g., a private key) may be computationally infeasible from the other key (e.g., a public key), even though they are related. Both public and private keys may be generated secretly as an interrelated pair.

For example, in public-key cryptosystems, a public key may be freely distributed, while its paired private key may remain secret. In a public-key encryption system, a public key may be used for encryption, while a private or secret key may be used for decryption.

The code signing module 322 verifies the integrity of code information exchanged between systems or devices. The code signing module 322 can verify whether content of exchanged information has been altered or tampered.

For example, the code signing module 322 may include a process of digitally signing executables or scripts to confirm a software author or generator and validates that an executable code or script has not been altered or corrupted. Also, for example, a code may be verified as altered or corrupted since it was signed by way of, but is not limited to, a cryptographic hash, checksum, etc.

In one or more embodiments, after the identification module 316 extracts the ID tokens 624 or the authentication module 320 validates the ID tokens 624, the code signing module 322 may generate the ID tokens 624, the key token 628, and the cryptographic token 626. The cryptographic token 626 may be generated by the code signing module 322 using the RoT code 620 to decode information from the RoT data 622.

In one or more embodiments, the code signing module 322 may generate the ID tokens 624 or the key token 628 using the cryptographic token 626 to further decode other information from the RoT data 622. In an embodiment, elimination of data breach is greatly simplified using the code signing module 322 having multiple levels of protection that improve information security or data confidentiality.

A secure object, such as the first secure object 602 or a second secure object 604, may interface with a secure execution engine 606. The secure execution engine 606 includes a mechanism that manages or controls operations of the secure object. The secure execution engine 606 includes a secure execution unit 324 and a secure storage unit 326.

The secure execution unit 324 is a block that executes codes or computer instructions in a protected environment. The environment in which the secure execution unit 324 operates may create a flexible, scalable solution to problems of creating a large-scale, wide-area secure environment in which only trusted, authenticated application code can operate. The secure execution unit 324 may enable the programmer 112 and the secure objects to work together in a secure environment.

The secure execution unit 324 may execute trusted codes that have been stored by the secure storage unit 326 when the secure objects were previously programmed, configured, tested, or certified before the secure objects operate in an end-user production environment. The trusted codes executed by the secure execution unit 324 may be signed and authenticated.

The secure storage unit 326 stores and provides trusted codes for the secure execution unit 324 to execute. In an embodiment, secure environment is greatly simplified using the secure execution engine 606 that stores program codes in the secure storage unit 326 and executes the program codes using the secure execution unit 324, thereby providing an additional level of protection against data breach.

For example, the trusted codes may be previously stored in a secure storage or memory area of the secure objects when the secure objects were previously programmed, configured, tested, or certified. Also, for example, the trusted codes may be decoded by the cryptography module 318 using information sent from the programmer 112 to the secure objects.

Figure 7:
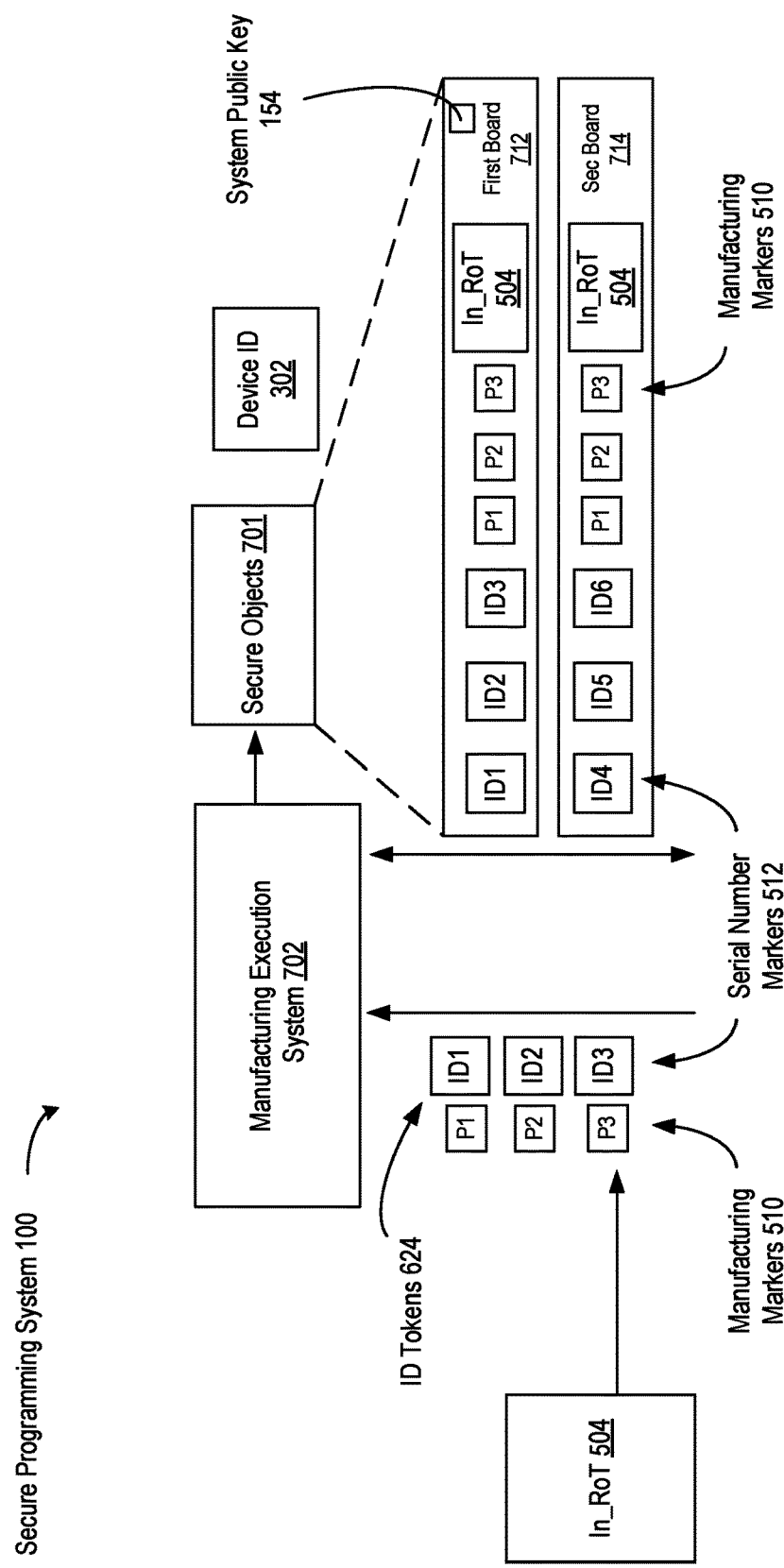
FIG. 7 depicts a second example block diagram of the secure programming system.

Referring now to FIG. 7, therein is shown a second example block diagram of the secure programming system 100. The example diagram shows a data flow of secure information during programming of secure objects 701.

For example, the identification tokens 624, depicted as ID1, ID2, and ID3, may include serial number markers 512 of the secure objects 701. The serial number markers 512 are unique information assigned to each of the secure objects 701. The serial number markers 512 of each of the secure objects 701 can be different from another of the serial number markers 512 of another of the secure objects 701 such that there may not be two of the secure objects 701 share the same serial number marker. The serial number markers 512 may be generated by the programmer 112. Each serial number marker may be assigned to each of the secure objects 701 by the programmer 112.

An incoming root of trust 504 (In_RoT) may include, but is not limited to a programmer identification 216. The incoming root of trust 504, denoted as In_RoT 504, includes information that have been previously programmed or configured prior to programming the secure objects 701. In one or more embodiments, the previously programmed information may have been programmed into a combination of adapters for programming the secure objects 701, the programmer 112, and the secure objects 701. For example, the In_RoT 504 can be a serial number implanted in one of the secure objects 701 at silicon manufacture time.

The manufacturing markers 510, such as P1, P2, P3, etc., may correspond with the identification tokens 624, such as ID1, ID2, ID3, etc., respectively. The In_RoT 504 can be used as a filter to qualify the manufacturing markers 510 to detect for counterfeit objects including components, boards, etc. The In_RoT 504 can come from the trusted devices 130.

The In_RoT 504 may be separate or different from the ID tokens 624. The In_RoT 504 may include information previously programed that is different from information to be programmed into the secure objects 701.

For example, the In_RoT 504 may include, but is not limited to, serial numbers or unique keys that were embedded or programmed into components at the time of manufacturing the components. Also, for example, the time of manufacturing the components may be, but is not limited to, a time when the components were manufactured at silicon level or a system level prior to programming the components.

In one or more embodiments, the In_RoT 504 may be ingested or input by a manufacturing execution system 702 (MES). The In_RoT 504 may be combined with a programmer generated unique RoT, such as the ID tokens 624, to generate a unique system-level RoT. The In_RoT 504 may include information from a digital birth certificate that has been previously programmed into a component during the manufacture of the component.

The In_RoT 504 may include any number of manufacturing markers 510, denoted as P1 and P2. The manufacturing markers 510 include information associated with components when the components are manufactured. For example, the manufacturing markers 510 may include, but is not limited to, a component ID, a programmer ID, a location of manufacture of a component, a date and a time of manufacture of a component, etc.

The manufacturing execution system 702 is a computerized system used in manufacturing for product quality control purposes. The MES 702 may track and document transformation of raw materials to finished goods. The MES 702 may provide information about how current conditions on a plant floor can be optimized to improve production output. The MES 702 work in real time to enable control of multiple elements of a production process (e.g., inputs, personnel, machines, support services, etc.).

In one or more embodiments, the MES 702 may receive the In_RoT 504 along with the ID tokens 624 to program the programmable devices 128. The In_RoT 504 and the ID tokens 624 may be used to generate the device identification 302 of one of the secure objects 701. The device identification 302 includes information that is unique and associated with only one device or only one of the secure objects 701.

The device identification 302 may include unique information that may be programmed into a system, such as the secure objects 701 including a first board 712, a second board 714, etc. The first board 712 or a second board 714 are board-level systems with several secure objects 701 assembled and connected with each other in the systems.

The first board 712 may include a system public key 154 for cryptography. The system public key 154 may be implemented in the first board 712 for a public key encryption system. The system public key 154 may be part of one of the key pairs 150. Security information may be encrypted by one of the secure objects 701 using the public key 154 of one of the key pairs 150 and decrypted by the first board 712 using the private key 152.

The first board 712 may use the system public key 154 to encrypt secure information and send to one of the secure objects 701, which may decrypt the encrypted information using the private key 152. Although the system public key 154 is described for the first board 712, it is understood that a system public key may be implemented in the second board 714.

The programmer 112, the programming unit 110, the MES 702 may use the system public key 154 to encrypt secure information. The secure objects 71 may use the private key 152 to decrypt the encrypted secure information.

System 100 illustrates only one of many possible arrangements of components configured to provide the functionality described herein. Other arrangements may include fewer, additional, or different components, and the division of work between the components may vary depending on the arrangement. For example, in some embodiments, some of the security modules may be omitted, along with any other components relied upon exclusively by the omitted component(s). As another example, in an embodiment, system 100 may further include multiple serial numbers or other system identifiers.

Figure 8:
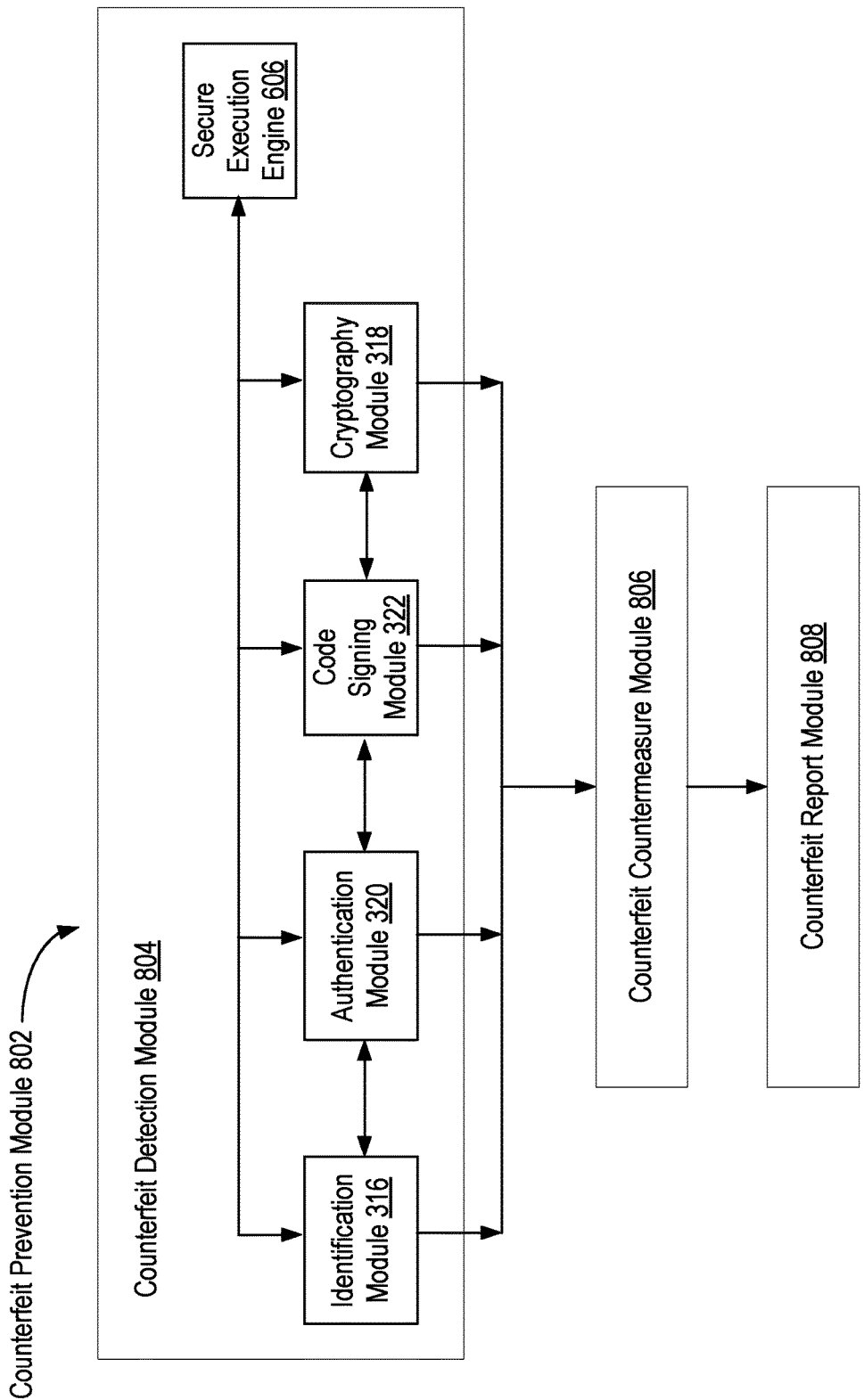
FIG. 8 is a block diagram of a counterfeit prevention module according to an embodiment.

Referring now to FIG. 8, therein is shown a block diagram of a counterfeit prevention module 802 according to an embodiment. The various elements of the counterfeit prevention module 802 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

The system may be a key component for counterfeit prevention, in accordance with one or more embodiments. Although an example of the system is described, other embodiments are applicable to any system that can be used to perform the functionality described herein. Components of the system may be connected by, for example, a data bus, a data link, an optical link, a Local Area Network (LAN), a Wide Area Network (WAN), the Internet, Intranet, Extranet, etc. Any number of devices within the system may be directly connected to each other through wired or wireless communication segments.

The system eliminates at least security breaches that cause fraudulent activities and imitation or reproduction of the secure objects 701. By creating a unique system level ID, based upon existing silicon roots of trust and unique manufacturing data, the manufacturing supply chain may be secured using the system. Counterfeit parts will not have predefined RoT and thus may be eliminated. Compromised firmware can also be detected by the system.

The system employs methods of counterfeit detection and prevention in manufacturing. The system may be used in the secure programming system 100 to filter counterfeit components or in the MES 702 to filter counterfeit boards. The system may be implemented in the secure programming system 100 to address secure manufacturing issues that arise at a component level where few components today have RoT (e.g., ID, etc.) at silicon (Si) manufacture time, resulting in component counterfeits at the stage where devices are pre-programmed. The system may also address issues at a system level where system/board counterfeits may occur at the board manufacturing stage. One of the secure objects 701 may be a device, such as one of the trusted devices 130.

In one or more embodiments, the system includes any combination of a counterfeit detection module 804, a counterfeit countermeasure module 806, a counterfeit report module 808, etc. The identification module 316, the cryptography module 318, the authentication module 320, the code signing module 322, and the secure execution engine 606 may be implemented using a combination of the adapters (e.g., 122, 124, 126, etc.), the security modules (e.g., 116, 118, 120, etc.), the programmer 112, the security controller 114, the security keys 106, the security master system 104, and the secure master storage system 102.

One or more components described within the system may be combined together in a single device or divided among several operatively linked discrete devices. Each of these components may be presented to clarify the functionalities described herein and may not be necessary to implement the embodiments. Furthermore, components not shown in FIG. 8 may also be used to perform the functionalities described herein. Functionalities described as performed by one component may instead be performed by another component or combination of components.

The counterfeit detection module 804 determines whether a security breach occurs. The counterfeit detection module 804 determines at least whether a device or a board is counterfeit or secure information has been compromised.

In one or more embodiments, the counterfeit detection module 804 includes any combination of the identification module 316, the cryptography module 318, the authentication module 320, the code signing module 322, the secure execution engine 606, etc. In one or more embodiments, any combination of the identification module 316, the cryptography module 318, the authentication module 320, and the code signing module 322 may interface with the secure execution engine 606.

In one or more embodiments, any combination of the identification module 316, the cryptography module 318, the authentication module 320, and the code signing module 322 individually may interface with each other in a sequential manner. For example, the identification module 316 determines the ID token 624, the authentication module 320 verifies the ID token determined by the identification module 316, the code signing module 322 validates integrity of the executable code, the cryptography module 318 uses the validated executable code to decode payload data based on the verified ID token 624.

The identification module 316 determines the ID token 624. In one or more embodiments, the ID token 624 may be determined using the RoT data 622 to extract the ID token 624. For example, the RoT data 622 may be from the secure storage unit 326. Also, for example, the RoT data 622 may be transmitted from the programmer 112 or the security modules of the secure programming system 100. Further, for example, the RoT data 622 may be from the security master system 104.

In one or more embodiments, the ID token 624 may be determined using the RoT code 620 to decipher information from any one of the components described above, including, but is not limited to, any of: the secure storage unit 326, the programmer 112, the security modules of the secure programming system 100, the security master system 104, etc. In one or more embodiments, the ID token 624 may be determined, not by the RoT data 622 stored in the secure storage unit 326, but by data sent from the secure storage unit 326, the programmer 112, the security modules of the secure programming system 100, or the security master system 104.

In one or more embodiments, the ID token 624 may be decoded from the RoT data 622 stored in the secure storage unit 326 or data received from the secure storage unit 326, the programmer 112 or the security modules of the secure programming system 100, the security master system 104. For example, the data may be decoded using a private key 152 or a cryptographic token 626 extracted from clear data followed by a signature or a predefined code pattern.

The signature or the predefined code pattern is unique since it is not user data or payload data. For example, the signature or the predefined code pattern may be encoded such that it may be decoded and recognized by the identification module 316.

In one or more embodiments, the signature or the predefined code pattern may be used as a delimiter to identify content immediately following the signature or the predefined code pattern as the cryptographic token 626 to be used for decoding data to extract the ID token 624. In one or more embodiments, the signature, the predefined code pattern, or the ID token 624 may have a predefined fixed length.

In one or more embodiments, the identification module 316 may at least prevent any unauthorized attempt to spoof a device by, for example, monitoring a signal trace on a board, intercepting data transmission of information through wired or wireless networks, etc. This would prevent a situation where multiple serial numbers are used for the ID token 624 in the secure program system 100. The identification module 316 may prevent any illegal cloning of a device or system by storing a predefined number of ID tokens 624 in a database or a priori storage implemented using, but is not limited to, any of: the secure storage unit 326, any protected storage units in the programmer 112, the security modules of the secure programming system 100, the security master system 104, etc.

In one or more embodiments, the identification module 316 may mark or identify each software (S/W) or firmware during programming of the S/W or the firmware onto a secure object. For example, the marking or identification of the S/W or application may also be protected using any cryptographic methods including, but is not limited to, any of: Data Encryption Standard (DES), Advanced Encryption Standard (AES), triple-DES, MD4 message-digest algorithm, MD5 algorithm, Secure Hash Algorithms 1 and 2, any other hashing algorithms, etc., to create a fingerprint to be used with the ID token 624.

The authentication module 320 verifies whether the ID token 624 is valid. The authentication module 320 may authenticate the ID token 624 using the RoT code 620 and the RoT data 622.

In one or more embodiments, the authentication module 320 may interface with the identification module 316 to receive the ID token 624 from the identification module 316. In one or more embodiments, the authentication module 320 may extract the ID token 624 using the methods described above in the identification module 316. In one or more embodiments, after the ID token 624 has been validated as valid, the authentication module 320 may execute the RoT code 620 to extract the cryptographic token 626 and the key token 628 from the RoT data 622.

The cryptography module 318 employs techniques for secure communication in the presence of third parties or adversaries. For example, the cryptography module 318 may encrypt or decrypt information using the key pair 150 with the public key 154 and the private key 152.

In one or more embodiments, the cryptography module 318 may be implemented in a secure object so that the object may be able to decrypt information. In an embodiment, prevention of fraudulent attempts to reverse engineer a decryption process is greatly simplified using the cryptography module 318 that is implemented in a secure object. The cryptography module 318 may be built-in the secure object and so may at least avoid counterfeits because it is not possible to monitor or spoof input/output (I/O) ports, busses, or trace signals to perform a reverse engineering process of converting an unintelligible ciphertext back to plaintext since all decryption processing steps are performed internally in the secure object.

In one or more embodiments, the cryptography module 318 may be implemented with a two-way communication mechanism, which is a method of sending information between two devices. The two-way communication mechanism may include a request from a device and an acknowledgement from another device. The two-way communication mechanism may include cryptography to protect ordinary information or plaintext using unintelligible text or ciphertext.

For example, the cryptography module 318 may be implemented in a secure object and communicate with another secure object including, but is not limited to, any of: the programmer 112, the security modules, the security master system 104, etc., after the ID token 624 has been validated. Communication between the cryptography module 318 and another secure object may employ a key pair 150. A public key 154 and a private key 152 of the key pair 150 may be received from a certificate authority (CA), which may be, for example, a server that stores public keys where owners of the keys and every device in communication with the server trusts this server.

In one or more embodiments, validation of the ID token 624 may be implemented in the cryptography module 318 since the cryptography module 318 includes at least cryptographic capability to further protect confidential information. For example, the cryptography module 318 may receive a request along with the ID token 624 from another secure object, the programmer 112, the security modules, or the security master system 104, for validation of the ID token 624.

The ID token 624 may be encoded using a public key 154 of the other secure object. The cryptography module 318 may decode the ID token 624 using a private key 152. After the cryptography module 318 validates that the decoded ID token 624 is valid, the cryptography module 318 may encode an acknowledgement message and an optional status using another public key 154 or the same public key 154. For example, the status can indicate whether the request is complete, the received ID token 624 is valid, etc. The encoded message and status may be sent to the other secure object, which may decode the message and status using the private key 152.

In an embodiment, elimination of unauthorized accesses and device cloning are greatly simplified using the two-way communication mechanism that includes additional steps of performing secure acknowledgement or secure identification. Although the two-way communication mechanism is described for the cryptography module 318, in accordance with one or more embodiments, the two-way communication mechanism may be implemented in any other modules or units of the secure program system 100.

In one or more embodiments, after the ID token 624 has been validated as valid, the authentication module 320 may execute the RoT code 620 to extract the cryptographic token 626 and the key token 628 from the RoT data 622. In one or more embodiments, the cryptographic token 626 may be used to decipher information for additional level(s) of security to generate any secure content, such as the key token 628 to be used to encrypt or decrypt user data or payload.

The code signing module 322 verifies integrity of a code or application software exchanged between secure objects. The code signing module 322 may include a process of digitally signing executables or scripts to confirm a software author or generator and validates that an executable code or script has not been altered or corrupted. In one or more embodiments, the code signing module 322 may employ methods described above in a combination of the identification module 316, the authentication module 320, and the cryptography module 318 for generation of the ID token 624, the key token 628, and the cryptographic token 626.

The counterfeit countermeasure module 806 identifies or removes counterfeits. For example, the counterfeit countermeasure module 806 may filter out the programmable devices 128 that are identified as unauthorized based on the ID token 624 from an original equipment manufacturer (OEM). The programmable devices 128 that are identified as good or authorized may be marked as secure objects when the ID tokens 624 are verified as valid.

In one or more embodiments, when the counterfeit detection module 804 determines that a programmable device 128 is detected as invalid, unauthorized, compromised, corrupted, etc., the programmable device 128 may be rejected or marked to be rejected in a production environment, manufacturing environment, or the secure program system 100. In one or more embodiments, the programmable device 128 that is rejected may be binned or sorted to a separate area and subsequently physically destroyed in manufacture or OEM sites.

In one or more embodiments, the counterfeit detection module 804 may write a unique identifier or pattern to a secure storage or memory (e.g., the secure storage unit 326, etc.) in an unauthorized programmable device 128 to indicate that the device is unauthorized or has been tampered with or compromised. The unique identifier or pattern is detectable and recognizable and so may not be treated or interpreted as user data or payload.

The counterfeit report module 808 reports a programmable device 128 as an authorized device or an unauthorized device. For unauthorized devices, the counterfeit report module 808 may report the ID tokens 624 of the unauthorized devices and save the ID tokens 624 for ease of detection of unauthorized devices in subsequent identification or authentication processes.

In one or more embodiments, the counterfeit report module 808 may report information or parameters associated with unauthorized devices or of the programmer 112 that was used to program the devices. The parameters may be reported to a combination of the adapters, the security modules, the programmer 112, the security controller 114, the security master system 104, etc.

For example, the counterfeit report module 808 may generate an actual report that can tell an operator or an administrator what the statistics were for the devices and can indicate batch information, manufacture dates, software origin, etc. Also, for example, actual graphical or textual reports can be generated as a result of all this besides the security aspects.

For example, a parameter may include, but is not limited to, any of: dates, times, geographical locations, OEM identifications, In_RoT 504, serial number markers, firmware markers, manufacturer markers, system test markers, operating markers, physical uncloneable function (PUF) markers, ID tokens 624, cryptographic tokens 626, key pairs 150 with the public keys 154 and private keys 152, fingerprints, signatures, predefined code patterns, etc. Also, for example, the parameter may be saved into a secure storage implemented in, including, but not limited to, any of: a combination of the adapters, the security modules, the programmer 112, the security controller 114, the security keys 106, the security master system 104, the secure master storage system 102, etc.

In an embodiment, subsequent detection and authentication of unauthorized devices are greatly simplified using parameters associated with unauthorized programmable devices that are saved to facilitate subsequent processing and to improve the overall performance of a system.

The block diagram illustrates only one of many possible flows for counterfeit prevention. Other flows may include fewer, additional, or different elements, in varying arrangements. For example, in some embodiments, the identification module 316 may be omitted, along with any other elements relied upon exclusively by the omitted element(s). As another example, in an embodiment, a flow may further include a key storage module.

Figure 9:
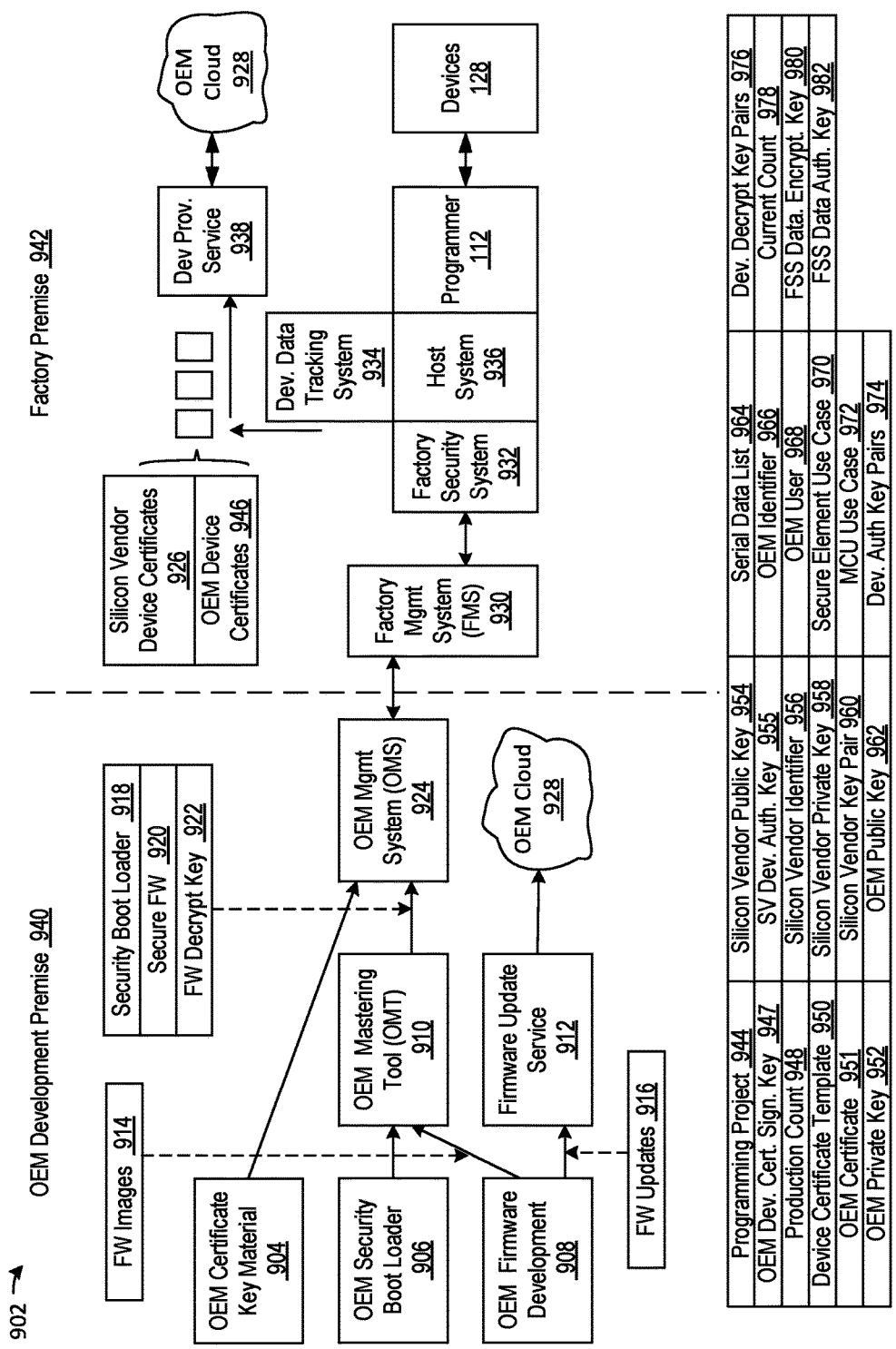
FIG. 9 is an example of a managed and security processing system.

Referring now to FIG. 9, therein is shown an example of a managed and security processing system 902 (MSP system). The MSP system 902 can securely deploy and provision the programmable devices 128.

The MSP system 902 can individually configure data devices and active, trusted devices with cryptographic information to provide a secure programming and operation environment. The MSP system 902 can allow the secure programming of the programmable devices 128 at a secure original equipment manufacturer (OEM) site.

The MSP system 902 can be one of the embodiments of the secure programming system 100. The elements of the MSP system 902 can be implemented using the element of the secure programming system 100.

The MSP system 902 can support the operation of the system distributed in part across multiple locations or premises. The MSP system 902 can include an OEM development premise 940 and a factory premise 942. The OEM development premise 940 can be used to prepare for the actual programming and provisioning of the programmable devices 128. The OEM development premise 940 can be used to prepare programming information for multiple factories. The OEM development premise 940 is a location where an OEM can prepare the programming project 944 having the information for configuring a set of secure devices, such as the programmable devices 128, secure elements, trusted devices 130, or other similar devices.

Although there are differences between the different types of secure devices, the terms are generally understood to be interchangeable and are general in nature. The secure devices, secure elements, programmable devices 128, trusted devices 130, and other similar elements can be used interchangeably in this description for convenience and brevity.

The OEM development premise 940 can take firmware images 914 that are used to provision the programmable devices 128 and prepare the programming project 944. The programming project 944 can then be securely transferred to the factory premise 942 and used to control the programming of the programmable devices 128.

The OEM development premise 940 can have a set of secure manufacturing systems and data stores for facilitating creating the programming project 944. For example, the OEM development premise 940 can include OEM Key Material 904, an OEM Security boot loader 906, the OEM firmware development system 908, an OEM mastering tool 910, a Firmware Update Service 912, and an OEM Management system 924.

The firmware images 914 are not used to security provision the programmable devices 128. The OEM Security boot loader 906 is used to security provision the programmable devices 128 including, but are not limited to, security microcontroller unit (MCU) devices. The firmware images 914 are application code that can be encrypted by the OEM mastering tool 910 and programmed into the programmable devices 128 after the programmable devices 128 have been security provisioned by programming and executing the OEM Security boot loader 906 on the programmable devices 128.

The factory premise 942 is a location for programming and provisioning the programmable devices 128. The factory premise 942 can be a programming center, a fabrication facility, a contract manufacturer site, or a similar location. In an embodiment, the factory premise 942 is where the programmer 112 and the programmable devices 128 are locate and operated.

The MSP system 902 can include a security boot loader 918. The security boot loader 918 is the secure programming code that can be executed at boot time on the programmable devices 128 to insure compliance with the security protocols. The OEM security boot loader 906 creates device identity, creates the ability to accept an encrypted data stream and de-crypt on-device and initializes a secure run time environment on the device so that firmware can run securely on the device.

The MSP system 902 can also include secure firmware 920. The secure firmware 920 is software code and data to be embedded in non-volatile memory of the programmable devices 128. The secure firmware 920 can be transferred in an encrypted state and decrypted at the programmer 112.

The MSP system 902 can include a firmware decrypt key 922. The firmware decrypt key 922 can be used to decrypt the secure firmware 920 that has been encrypted using the encryption key related to the firmware decrypt key 922. For example, the firmware decrypt key and the encryption key can be part of a symmetric key pair used for encryption.

The MSP system 902 can include firmware images 914 from the OEM. The firmware images 914 are embedded application code that will be loaded by OEM security boot loader 906 and run on the programmable devices 128 during and after manufacturing.

The MSP system 902 can include the OEM key material 904. The OEM key material 904 can include information such as a silicon vendor device authentication key 955, an OEM device certificate signature key 947 required to sign an OEM device certificate 946, and an OEM device certificate template 950.

The OEM device certificate template 950 is a block of information used to form the OEM device certificate 946. It includes the basic required information for the OEM certificate 951. The OEM certificate 951 is a block of information that defines an OEM user 968. The OEM certificate 951 can include an OEM identifier 966, an OEM public key 962 and an OEM private key 952. The OEM identifier 966 is a value that uniquely identifies the OEM.

Each programmable device 128 can be represented by a device specific key pair, such as the key pair 150, that may be generated in a factory security system 932 or created on the programmable device 128. Each OEM device certificate 946 can have a public key 154 of the device specific key pair. A private key 152 of the device specific key pair can be programmed in the secure storage unit 326 on the programmable device 128 if the device specific key pair is generated in the factory security system 932 or may not leave the programmable device 128 if the device specific key pair is generated on the programmable device 128.

A silicon vendor is an entity that can manufacture or provide the programmable devices 128. The silicon vendor can be identified with a silicon vendor identifier 956. The silicon vendor identifier 956 is a value linked to the silicon vendor. For example, the silicon vendor identifier 956 can be linked to the company that actually makes the integrated circuits or components that form the programmable devices 128. The silicon vendor can also be a company that pre-configures the programmable devices 128 before delivering them for programming by the system.

The MSP system 902 can include a OEM firmware development system 908. The firmware development system 908 supports the development of firmware images 914 for deployment to the programmable devices 128.

The MSP system 902 can include the OEM Mastering Tool 910 (OMT). The OEM mastering tool 910 is a security application or system that can bind the OEM security boot loader 906 to the firmware images 914. The OEM mastering tool 910 can sign and encrypt the firmware images 914 and prepare the firmware images 914 for field updates. The field upgrades can allow the firmware deployed in the programmable devices 128 to be changed remotely in a secure fashion. The OEM mastering tool 910 can product the secure firmware 920 by encrypting the firmware images 914 using the firmware decrypt key 922. The OEM mastering tool 910 can include a HSM or TSM and be implemented in hardware or software.

The MPS system 902 can include an OEM management system 924. The OEM management system 924 is a system for defining a programming project 944 for an OEM user. The programming project 944 is an information package that defines a secure production run of the programmable devices 128.

The OEM management system 924 can bind the OEM Security Boot Loader 906, the firmware images 914, the OEM certificate 951, the OEM key materials 904, and a production count 948 to the programming project 944. Once the programming project 944 is initially created, the programming project 944 can updated to include the references, code, and data of the OEM security boot loader 906, the firmware images 914, the OEM key materials 904, the OEM certificate 951, and the production count 948. The binding process means that the information is part of the parameters of the programming project 944. The OEM management system 924 can also bind the programming project 944 to a specific security programming system at the factory premise 942. The programming project 944 can include the system identification 814 of a programming system or subsystem such as the secure programming system 100, the programming unit 110, the programmer 112, or a combination thereof. Then the programming project 944 can only be performed on a system having the system identification 814.

The production count 948 is an indicator describing the number of secure devices to be produced in the production run. The production count 948 can be compared to an incrementing number that is updated when a secure device begins or completes production. The programmer 112 receiving the programming project 944 can use the production count 948 to limit the number of devices programmed and provisioned to prevent unauthorized production of the programmable devices 128. During production, a current count 978 can indicate the current number of the products that have been produced. The system can stop programming the devices by comparing the current count 978 to the production count 948 and stopping when the current count 978 is equal to the production count 948.

The OEM management system 924 can be configured in a variety of ways. For example, the OEM management system 944 can be implemented in a shared configuration and generate the programming project 944 for deployment to multiple OEMs each having their own factory, such as the factory premise 942. The OEM management system 924 can be implemented using the secure master storage system 102, the security master system 104, the secure programming system 100, or a combination of systems and subsystems thereof.

The MSP system 902 can include a factory management system 930. The factory management system 930 is a system for managing the secure programming components at the factory premise 942. The factory management system 930 can receive the programming project 944 from the OEM management system 944 and the decrypt and distribute the manufacturing information to the other security and programming systems located at the factory premise 942.

The factory management system 930 can be implemented in a variety of ways. For example, the factory management system 930 can be implemented with the manufacturing execution system 702, the programming processor 202, the host computer system, or another similar processing system.

The MSP system 902 can include the factory security system 932. The factory security system is an HSM based security appliance that generates keys and certificates to be programmed into the programmable devices 128. The factory security system 932 can support a multi-tenant OEM architecture by isolating the security information of one OEM from that of another. This allows the factory security system 932 to program and provision different sets of the programmable devices 128 for different OEMs in different programmers.

The factory security system 932 can be configured in a variety of ways. For example, the factory security system 932 can be implemented using the security master system 104, the security controller 114, the programming processor 202, the first security module 116, the second security module 118, the nth security module 120, or a combination thereof. The factory security system 932 can be implemented in a centralized or distributed fashion using one or multiple security components in the MSP system 902.

The factory security system 932 can provide high security encryption services including key pair generation, encryption, decryption, certificate management, secure storage, secure execution, and other similar security processing features. The factory security system 932 can also support secure development, secure mastering, secure deployment of data and code, secure provisioning, secure programming, and secure updates.

The factory security system 932 can perform device authentication based on-device certificates, deployment management and versioning, digital lifecycle management, and application management. The factory security system 932 can provide symmetric encryption, hash functions, data encapsulation, digital signatures, key agreement and transport, key management, and user access control.

The factory security system 932 can include a factory security system certificate 933 for authenticating the identity of the factory security system 932. The factory security system certificate 933 can be used to sign information transferred from the OEM development premise 940 and the OEM management system 924 to the factory management system 930 and the factory security system 936. The factory security system 932 can include a factory security system data encryption key 980 and a factory security system data authentication key 982. The keys can be used to securely encrypt, decrypt, sign, and authenticate secure information.

The MSP system 902 can include a host system 936 at the factory premise 942. The host system 936 is a computer system for controlling the execution of the programming project 944 and managing the communication between the programmer 112 and Factory security system 932.

The host system 936 can be implemented in a variety of ways. For example, the host system 936 can be implemented using the security controller 114, the programming processor 202, or another similar computing system coupled to the secure processing system 100. The host system 936 can be coupled to the factory security system 932, the programmer 112, the factory management system 930, or other similar systems.

The MSP system 902 can include the programmer 112 for programming the programmable devices 128. The programmer 112 can receive a set of blank or partially programmed devices and securely program the programmable devices 128 with the information from the programming project 944.

The programmer 112 can create serial data lists 964 for programming the programmable devices 128. The serial data lists 964 are lists of device specific data to be programmed into the programmable devices 128. This can include the firmware images 914, the OEM device certificate 946, code, data, or other information. The serial data lists 964 can vary based on the individual device information, such as serial numbers, device identification, data certificates, or similar device specific parameters.

The MSP system 902 can include device certificates to protect the programmable devices 128. The device certificates can include silicon vendor device certificates 926, original equipment manufacturer device certificates 946 (OEM device certificates 946), or other device certificates. The device certificates can include information about the programmable devices 128 including public keys, the device identification 302, a silicon vendor identifier 956, the OEM identifier 966, or other similar information.

The silicon vendor device certificate 926 is set of data elements that securely define the identity of one of the secure elements, such as the programmable devices 128 or trusted device 130. The silicon vendor device certificate 926 can include the device identification 302, a silicon vendor public key 954, and/or other security information. Information encrypted by a silicon vendor private key 958 can be decrypted using the silicon vendor public key 954 of a silicon vendor key pair 960.

The silicon vendor device certificate 926 can be programmed into a secure storage unit of the secure element by the silicon vendor or manufacturer before the secure elements are transferred to other manufacturers or users. The silicon vendor device certificate 926 can be stored in a write-once secure storage unit where additional information may be added to the silicon vendor device certificate 926, but existing information cannot be erased or modified. Portions of the secure storage unit can be locked when no further changes are required. The secure storage unit can include one or more data elements, such as multiple device certificates and other related security data.

The silicon vendor device certificates 926 can be implemented in a variety of ways. For example, the silicon vendor device certificates 926 can be implemented using the manufacturing markers 510, the security certificate 306, the security algorithm 304, the product markers 508, the operating markers 514, the incoming root of trust 504, the trusted certificate 402, or another similar data element.

The MSP system 902 can include a device data tracking system 934 for providing device level programming statistics in real time. The device data tracking system 934 can track device level information for the secure programming system 100 in the local factory or for devices being provisioned remotely. The device data tracking system 934 can track device level information for each of the programmable devices 128 configured by the programmer 112 in the MSP system 902. The device data tracking system 934 can track data such as the silicon vendor device certificates 926, the system identification 814, the device identification 302, or other data elements that have been programmed into devices. The device data tracking system 934 can track device status including validity status, configuration status, duplicate status, or other device level status.

The MSP system 902 can include a device provisioning service 938. The device provisioning service 938 is a system for provisioning the programmable devices 128 over the Internet. The device provisioning service 938 can be a combination of hardware and software that can securely deliver provisioning information to the programmable devices 128 in the field. The device provisioning service 938 can distribute security information, data updates, software updates, and other security and operational information needed for continued secure operation of the devices.

The MSP system 902 can include a firmware update service 912. The firmware update service 912 is a system for updating the firmware of the programmable devices 128 over the Internet, such as an OEM cloud 928. The firmware update service 912 can securely deliver firmware updates 916 to a system having one or more of the programmable devices 128 and update the programmable devices 128 with the new firmware. The firmware updates 916 are software and data packages used to update the firmware in the programmable devices 128. The firmware update service 912 can be part of a system having security software and hardware that can deploy the firmware updates 916 and associated security information to ensure the programmable devices 128 are updated securely.

The MSP system 902 can be operated in a variety of ways. In an illustrative example, the MSP system 902 can be operated based on a secure element use case 970. The secure element use case 970 can describe one way to use the MSP system 902 to securely program the programmable devices 128 where the programmable devices 128 are already configured with firmware and have the silicon vendor device certificate 926 pre-installed at the silicon vendor facility.

The secure element use case 970 can include two major steps. In step 1, the silicon vendor device certificate 926 is extracted from one of the programmable devices 128 and the device is authenticated. In step 2, the OEM device certificate 946 is created based on the silicon vendor device certificate 926 of the authenticated device. Then the OEM device certificate 946 is programmed into the device.

In this use case, an HSM-based security system, such as the factory security system 932, can be integrated as part of the secure programming system, such as a system for programming secure microcontroller units with integrated security areas. The integrated security areas can be protected areas of memory that can be written once and not changed. This allows the non-modifiable storage of security data such as keys, code, or certificates.

The system can include an OEM management system 924, the factory management system 930, a job creation and job runner system, and the device data tracking system 934 to manage the status data for the programmable devices 128. The various systems can be implemented in a variety of ways. For example, the OEM management system 924, the factory management system 930, a job creation and job runner system, and the device data tracking system 934 can all be executed as software on the host system 936. In another example, the systems can each run on dedicated hardware.

In this security model, the factory premise 942 can act as a proxy for the OEM user and can execute the functionality of the OEM management system 924. This effectively implies that the OEM user 968 implicitly trusts the factory premise 942 with providing the OEM key materials 904 and the OEM certificate 951 and setting the production count 948 for the programmable devices 128. Since this activity is done on the host system 936 of the programming unit 110, the job setup, the generation of the OEM Key Material 904, and the configuration of the secure programming system 100 be done by authorized personnel at a physically secure location within the factory premise 942.

Some implementations can focus on the provisioning of the OEM device certificates 946 onto the programmable devices 128 that are being configured as secure elements. However, it is understood that securing the flow of the OEM key material 904 and secure updating of the production count 948 by the OEM systems are protected by physical security means and secure data channels.

The OEM data from the OEM development premises 940 is secure and encrypted from OEM management system 924 all the way to the factory security system 932 as the data is encrypted and tied to a specific one of the factory security system 932. For example, the programming project 944 can be encrypted using the factory security system certificate 933 which can only be decrypted by the intended one of the factory security system 932.

In another example, the transfer of the OEM key material 904, including the OEM device certificate signature key 947 is done securely because the material is encrypted during transmission. The OEM device certificate signature key 947 can include a private key component.

In an illustrative example, since the private key 152 of the programmable devices 128 never leaves the device and the import of the OEM Device Certificate signature key 947 into OEM management system 924 is done securely. This can reduce the need for physical security since the data is encrypted.

In another illustrative example, the MSP system 902 can be operated based on a microcontroller unit (MCU) use case 972 where the MSP system 902 is used for provisioning the programmable devices 128 and trusted devices 130, such as secure microcontroller units. The secure microcontroller units can include secure processing and secure storage facilities.

The MCU use case 972 can include two primary steps. In the first step, the OEM security boot loader 906 can be programmed into the programmable devices 128. Afterward, the programmable devices 128 can be booted using the OEM security boot loader 906 to create device authentication key pairs 974 and device decryption key pairs 976 for the programmable devices 128. Then the OEM device certificate 946 can be constructed, programmed, and signed using portions of the two key pairs.

In the second step, the MSP system 902 can read the silicon vendor device certificates 926 and authenticate the programmable devices 128. The firmware decrypt key 922 can be encrypted with device decryption key from the silicon vendor device certificate 926. The encrypted firmware and the encrypted firmware decrypt key 922 can be programmed on the programmable devices 128.

The OEM security boot loader 906, the OEM firmware development 908, the OEM mastering tool 910, the OEM management system 924, and the generation of the OEM Key Material 904 can all be performed at the OEM development premise 940. The overall project definition and the determination of the production count 948 are controlled by OEM user 968.

The OEM software execution environment can be hosted on a computer at the OEM development premise 940. All the OEM Roots of Trust are securely transported from the OEM development premise 940 to the factory premise 942. The factory management system 930, the factory security system 932, and the device data tracking system 934 can execute at the factory premise 942 on the host system 936.

In an embodiment, because the first step requires secure provisioning of the programmable devices 128, it must be performed in a secure facility, such as an OEM trusted factory, a silicon vendor factory, an OEM factory, or a programming center. Step 2 can then be performed at a facility with a lower level of security, such as an untrusted Factory, a Contract Manufacturer, third party partner, or a similar type of facility.

In this Security model, the OEM Roots of Trust and the programming project 944 are defined at the OEM development premise 940 and the distributed to the factory premise 942. It is important that an OEM user should manager their own Roots of Trust to improve security of the supply chain for the OEM products.

In an illustrative example, the MCU use case 972 requires physical security because the key pair 150 of the programmable devices 128 is generated in the factory security system 932 and can potentially be exposed at the factory premise 942. The physical connection between the programmable devices 128 and the programmer 112 is in the clear, so someone with physical access to the systems of the factory premise 942 could snoop and steal important information. Thus, physical security should be implemented to protect the security information.

In an alternate example of the MCU use case 972, the programmable devices 128 can be blank and not pre-programmed with the silicon vendor device certificate 926. In this case, the OEM device certificate 946 can be used for authentication. In addition, the firmware decrypt key 922 can be encrypted using the public decryption key from the OEM device certificate 946, such as the OEM public key 962.

Figure 10:
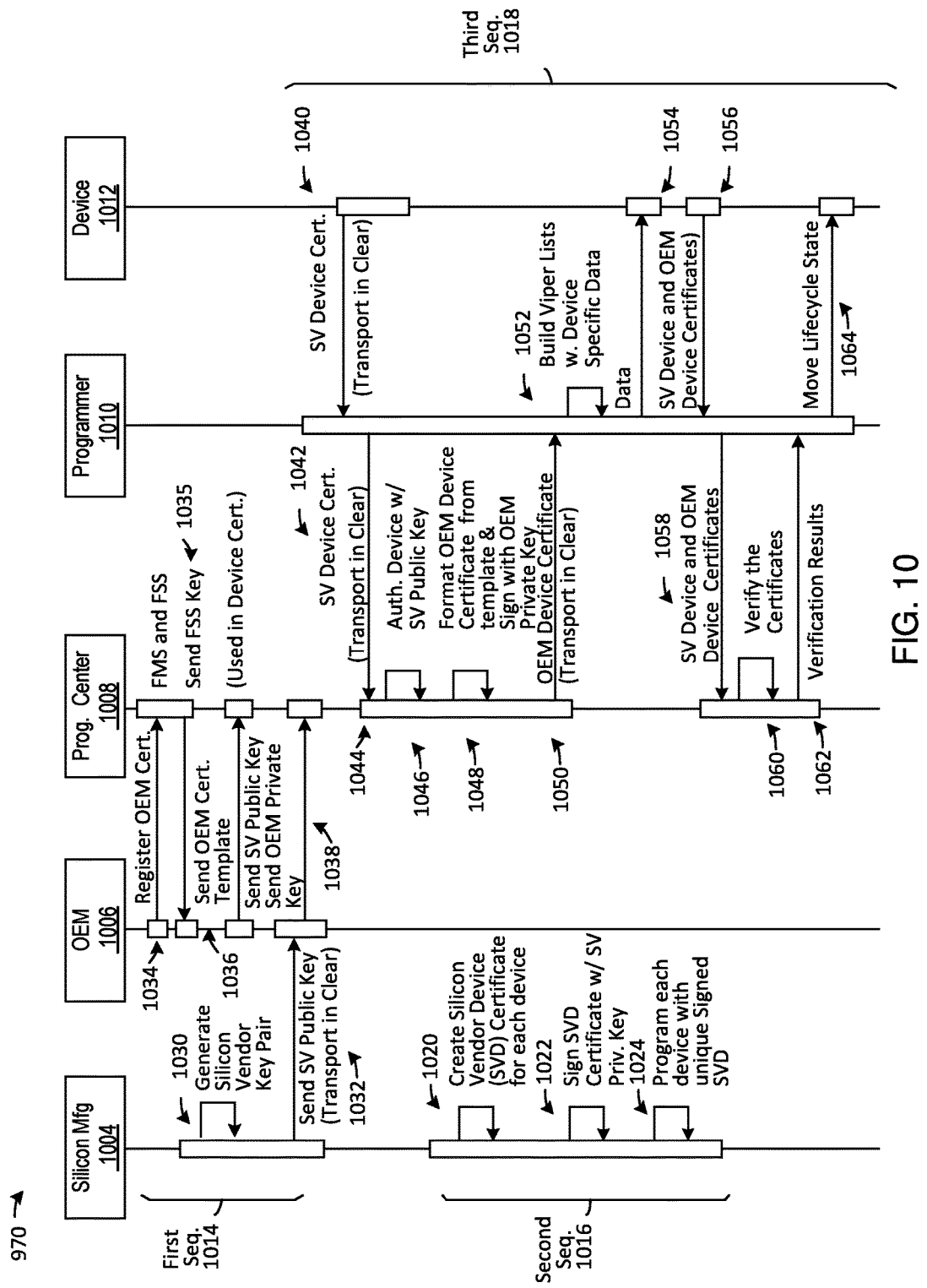
FIG. 10 is a detailed example of the secure element use case.

Referring now to FIG. 10, therein is shown a detailed example of the secure element use case 970. The secure element use case 970 describes the process for securely configuring the secure elements, such as the programmable devices 128. The MSP system 902 can securely deploy and provision each of the programmable devices 128 according to the secure element use case 970.

In the secure element use case 970, the secure elements can be instantiated, transferred, and managed at different premises. The premises can include different types of locations such as a silicon manufacturer 1004, an OEM location 1006, a programming center 1008, a programmer location 1010, and a device location 1012. Each of the premises represents a location where some type of secure programming related actions can occur. Further, the use case can include data and actions embedded at the programmer 112 and the device location 1012.

The secure element use case 970 can include three different sequences of events, each for performing a different secure activity. In a first sequence 1014, the MSP system 902 can initialize the factory security system 932 using OEM management system 924. This can be performed at the OEM development premise 940, the factory premise 942, or another similar location.

The MSP system 902 can also initialize the factory management system 930 at the factory premise 942, the programming center 1008, or another similar location. The factory management system 930 can be updated with the current count 978, a silicon vendor public key 954, an OEM private key 952, and a OEM device certificate template 950. The factory management system 930 can forward the information to the factory security system 932 for secure processing.

In the second sequence 1016, the secure elements are programmed at the silicon vendor (SV) factory with a silicon vendor device certificate 926.

In a third sequence 1018, the MSP system 902 can cryptographically authenticate each of the devices, such as the programmable devices 128 or trusted devices 130, using the silicon vendor device certificate 926 that was pre-installed in the second sequence 1016. Then the OEM device certificate 946 can be constructed and programmed into the programmable devices 128.

The OEM device certificate 946 can be constructed by re-using the public key portions of the device identity key pair from the silicon vendor device certificate 926, such as the silicon vendor public key 954. Therefore, the silicon vendor public key 954 can be used to calculate the OEM device certificate 946, so both certificates are certified using the same certificate. Alternatively, a different key pair can be used to represent the OEM identity separate from the silicon vendor key pair. This can be performed by the factory security system 932 or on the secure element itself.

In the second sequence 1016, step 1020 is performed at the silicon manufacturer 1004. The silicon manufacturer 1004 can be the company that creates the raw secure elements. The silicon vendor device certificates 926 are created for each of the secure elements, such as the programmable devices 128 or trusted devices 130. The silicon vendor device certificates 926 can include unique information about each of the secure elements, such as the device identification 302, serial numbers, product type, manufacture date, or similar device information.

Step 1022 is also performed at the silicon manufacturer 1004. Each of the silicon vendor device certificates 926 is signed with the silicon vendor private key 958 of the silicon manufacture with the silicon vendor identifier 956. Signing the silicon vendor device certificate 926 encrypts the data of the certificate. The data can be decrypted only with the silicon vendor public key 954.

Step 1024 is also performed at the silicon manufacturer 1004. Each of the programmable devices 128 is programmed with the silicon vendor device certificate 926 that was signed with the silicon vendor private key 958. The silicon vendor device certificate 926 signed by the silicon vendor private key 958 shows that the device is approved or provided by the silicon vendor. Successfully decrypting the silicon vendor device certificate 926 with the silicon vendor public key 954 can authenticate that the programmable device 128 is from the silicon vendor that signed it.

The second sequence 1016 can uniquely tag each of the programmable devices 128 with a unique and individual instance of the silicon vendor device certificate 926 that has been further signed with the silicon vendor private key 958. This provides that the silicon vendor device certificate 926 can be decoded using the silicon vendor public key 954 to verify that the silicon vendor device certificate 926 was provided by the silicon vendor having the silicon vendor identifier 956. This allows the factory or other device user to determine the authenticity of the programmable devices 128.

The first sequence 1014 is performed at the silicon manufacturer 1004, the OEM location 1006, and the programming center 1008. The first sequence 1014 can configure the programming components at the programming center 1008 for secure programming.

In a step 1030, the silicon vendor can generate the silicon vendor key pair 960 having a silicon vendor public key 954 and a silicon vendor private key 958. This can be a silicon vendor key pair 1080 having a silicon vendor private key 958 and silicon vendor public key 954.

In a step 1032, the silicon vendor public key 954 can be transferred to the OEM user 1006. The silicon vendor public key 954 can be sent in the clear and unencrypted. For example, the silicon vendor public key 954 can be sent over a network link.

In a step 1034, the OEM user 1006 can register the OEM certificate 951 with the factory management system 930 and the factory security system 932 of the programming center 1008. The OEM certificate 951 can include the OEM public key 962 to decrypt and authenticate information that was encrypted or signed with the OEM private key 962. The registration of the OEM certificate at the programming center 1008 can be performed securely to provide the programming center 1008 with the security information for the OEM user 1006. The registration can be performed to introduce and identify the OEM credentials into the factory management system 930 and the factory security system 932.

In a step 1035, the factory management system 930 and the factory security system 932 can send a factory security system encryption key 980 to the OEM management system 924 in a secure exchange process. The factory security system data encryption key 980 can be used to encrypt information sent from the OEM user 1006 to the factory management system 930 and the factory security system 932 to support the secure transfer of information. The factory security system 932 can send the factory security system data encryption key to the OEM management system 924.

In a step 1036, the OEM user 1006 can create a package having the SV device authentication public key, the OEM device certificate signature key, and the OEM device certificate template 950. The OEM device certificate signature key can be created in OEM management system 924 or imported from an external security system such as an external HSM. The package can be encrypted in the OEM management system 924 using the factory security system data encryption key 980 and then sent to the factory management system 930 and the factory security system 932. Because the package has been encrypted using the factory security system data encryption key 980 of the factory security system 932, it can only be decrypted using the factory security system data authentication key 982 of the factory security system 932. The OEM device certificate template 950 is a template for the OEM device certificate 946 that includes the public key 152 of the device having the device identification 320 and then signed by the OEM Private Signature key. The OEM public key 962 is a cryptographic value tied to the OEM user 1006. The OEM public key 962 have a variety of formats. For example, the key can be formatted as an X.509 public key certificate or another public key format. The X.509 standard defines a public key certificate to show the ownership of a public key. The OEM public key 962 can provide validation information for a public key. The OEM public key 962 can be used for device certification in the programming center 1008.

In a step 1038, the OEM user 1006 can send the package having the silicon vendor public key 954, the OEM private key 952, and the OEM device certificate template 950 to the programming center 1008. The information in the package can then be used to sign the programmable devices 128.

The third sequence 1018 is performed on the programmer 112 and the programmable devices 128 at the programming center 1008 or a factory premise 942. The third sequence 1018 can authenticate the secure elements, provision and cryptographically sign the secure elements with the OEM information, and verify that the provisioned devices are authorized.

In a step 1040, the programmer 112 can read the silicon vendor device certificate 926 of each of the programmable devices 128 to be programmed. The silicon vendor device certificates 926 are transferred in the clear from the programmable devices 128 to the programmer 112.

In a step 1042, the silicon vendor device certificates 926 can be transferred from the programmer 112 to the factory management system 930 and the factory security system 932. The factory management system 930 controls the programming operation and the factory security system 932 will manage the device and system security.

In a step 1044, the silicon vendor device certificates 926 are received at the factory management system 930 of the programming center 1008. The programmer 112 is located at the factory premise 942.

In a step 1046, the programmable devices 128 can be authenticated using the silicon vendor public key 954. This step confirms that the devices to be programmed are provided by the silicon vendor having the silicon vendor identifier 956. The programmable devices 128 are authenticated when the silicon vendor device certificate 926 that was signed with the silicon vendor private key 958 in sequence 1 is decrypted using the silicon vendor public key 954. If the information in the silicon vendor device certificate 926 can be accessed using the silicon vendor public key 954, then the device is authenticated.

In a step 1048, the OEM device certificate 946 is formatted based on the OEM device certificate template 950. Then OEM device certificate 946 is signed with the OEM private key 952.

In a step 1050, the OEM device certificate 946 is transferred to the programmer 112. Because the OEM device certificate 946 has been encrypted and signed with the OEM private key 952, it can be transferred in the clear.

In a step 1052, the programmer 112 can build the serial data lists 964. The serial data lists 964 are list of device specific data to be programmed into the programmable devices 128. This can include the serial numbers, the device identification, the OEM device certificate 946, manufacturing markers, code, data, markers, mac addresses, device specific keys, or other information.

In a step 1054, the device specific data included on the serial data lists 964 can be programmed into the programmable devices 128 by the programmer 112. The serial data lists 964 can indicate where the device specific data should be stored. For example, the OEM device certificate 946 can be stored in the secure storage unit.

In a step 1056, the silicon vendor device certificate 926 and the OEM device certificate 946 are re-extracted and retrieved from the secure elements, such as the programmable devices 128 or the trusted devices 130, by the programmer 112. Even though copies of the silicon vendor device certificate 926 and the OEM device certificate 946 may already exist in the factory security system 932 or elsewhere in the system, the device certificates are re-extracted to verify the programmable devices 128 and to detect potential duplicate production runs, unauthorized duplication, or other improper activities. The validation steps can be used to ensure that the device certificates have been programmed without errors. This can include programming failures, device damages, bit errors, or similar errors.

In a step 1058, the silicon vendor device certificate 926 and the OEM device certificate 946 are sent to the factory security system 932 for verification and further use. The retrieved device certificates can be used for a second round of authentication to verify that the proper ones of the programmable devices 128 were programmed. This can be used to prevent unauthorized duplicate of the programmable devices 128 and to prevent counterfeiting the devices.

In a step 1060, the silicon vendor device certificate 926 and the OEM device certificate 946 are verified to make sure that the programmable devices 128 are proper. This can include validating the silicon vendor device certificate 926 using the silicon vendor public key 954 and validating the OEM device certificate 946 with the OEM public key 962. Validation of the device certificate involves comparing the public key in the device certificate with the public key in the silicon vendor certificate 1078 to ensure they match. In addition, the certificate can be processed through a certificate validation tool (not shown) to ensure that the format of the certificate is valid. The signature on the certificate is also validated using the factory security system 932.

In a step 1062, the verification results are sent back to the programmer 112. In a step 1064, the programmer 112 can processed the completed devices. If the programmable devices 128 are not validated, then the programmer 112 can identify the devices with a validation status indicating a bad device and transfer them to a bad devices receptacle (not shown) for disposal. If the programmable devices 128 are properly verified, then the programmable devices 128 can be updated with a verified state value and passed along as verified components. Alternatively, the programmer 112 can generate a validation report to log the device identification and the validation status of each of the programmable devices 128 in the production run. The programmable devices 128 that are invalid can be removed or destroyed at a later time.

Figure 11:
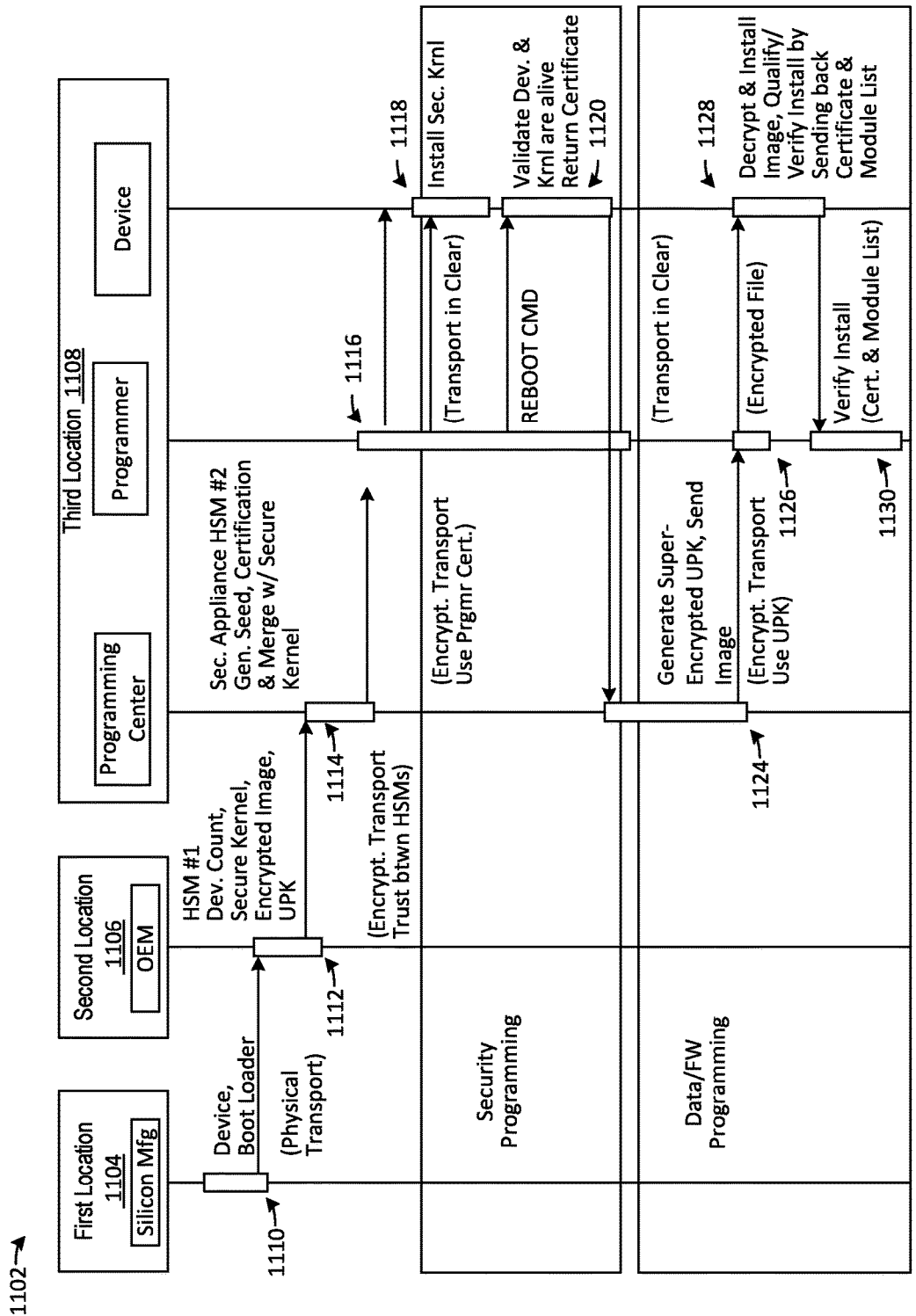
FIG. 11 is an example of an off-device seed and certificate generation use case.

Referring now to FIG. 11, therein is shown an example of an off-device seed use case 1102. The off-device seed use case 1102 can be performed in a hardware security module at a programming center.

In the off-device seed use case 1102, the security elements can be instantiated and managed between several locations. The locations can include a variety of configurations. For example, the first location 1104 can be a silicon manufacturer. A second location 1106 can be an original equipment manufacturer (OEM) location. The third location 1108 can be the device manufacturing or provisioning location. The third location 1108 can be a programming center where the programmer 112 and the programmable devices 128 are located. The third location 1108 can include 24-hour video surveillance of both the programmer 112 and the programmable devices 128 to prevent any tampering. The programmable device 128 can include security appliances, chips, memory devices, boards, or a combination thereof.

In a step 1110, the blank programmable devices 128 and the reference boot loader software can be provided by the microcontroller unit silicon vendor and be physically transported to the second location 1106 for further processing. The physical transport is a secure physical transport to prevent unauthorized access to the blank programmable devices 128 and the security software.

In a step 1112, the programmable devices 128 can be received at the second location 1106, such as an OEM. The OEM can develop the security kernel and/or a security bootloader by modifying the reference boot loader software. The OEM can also develop and provide the encrypted firmware image and the firmware encryption key (UPK). The OEM can also provide a total count of the devices that need to be produced. This information is kept in a first hardware security module (HSM #1) appliance at the OEM and can be provided to the programming center via encrypted transport into an on premise second hardware security module security appliance (HSM #2).

In a step 1114, the security appliance in the second hardware security module can generate all the signed device certificates and FAB certificates for each of the programmable devices 128 using random seeds generated in the second hardware security module. The HSM #2 security appliance can merge the seed, certificate, and secure kernel for each device as a programmable payload P. The security information can be transferred to the programmer 112 using an encrypted transport using the programmer certificate.

In a step 1116, the programmer 112 can program the trusted devices 128 with the programmable payload P and then lock the device from any modification of the programmable payload. The private keys of the key pairs do not need to be programmed into the device because the device can use the seed to generate the private keys on demand at any time on the device. This generation of the private key is part of the security kernel and can only be securely accessed through security kernel. In a step 1118, one of the programmable devices 128 can be programmed with the security kernel.

In a step 1120, the programmer 112 can issue a reboot command to validate that the device and security kernel are alive and then return with the device certificate. In a step 1124, the security appliance uses the public data encryption key from the device certificate of the device to generate the device specific super encrypted UPK. The super encrypted key and the encrypted firmware image can then be sent back to the programmer 112 for programming into one of the programmable devices 128.

In a step 1126, the encrypted file can be programmed into one of the programmable devices 128. The encrypted file can be transferred to one of the programmable devices 128 as an encrypted file.

In a step 1128, the programmer 112 can transfer the encrypted file to one of the programmable devices 128 where the image is decrypted and installed in one of the programmable devices 128. The installation of the image is qualified and verified by sending back the certificate and the module list to the programmer 112.

In a step 1130, the programmer 112 can verify the installation of the encrypted file on the programmable devices by matching the certificate and module list to a list of known certificates and modules.

Generating the device seed in the second hardware security module at the programming center increases the overall level of manufacturing security by reducing the number of opportunities for leaking the security elements. Because the programming center is a controlled environment with 24-hour a day video surveillance, the programmable devices 128 can be programmed with a higher degree of security and integrity.

Figure 12:
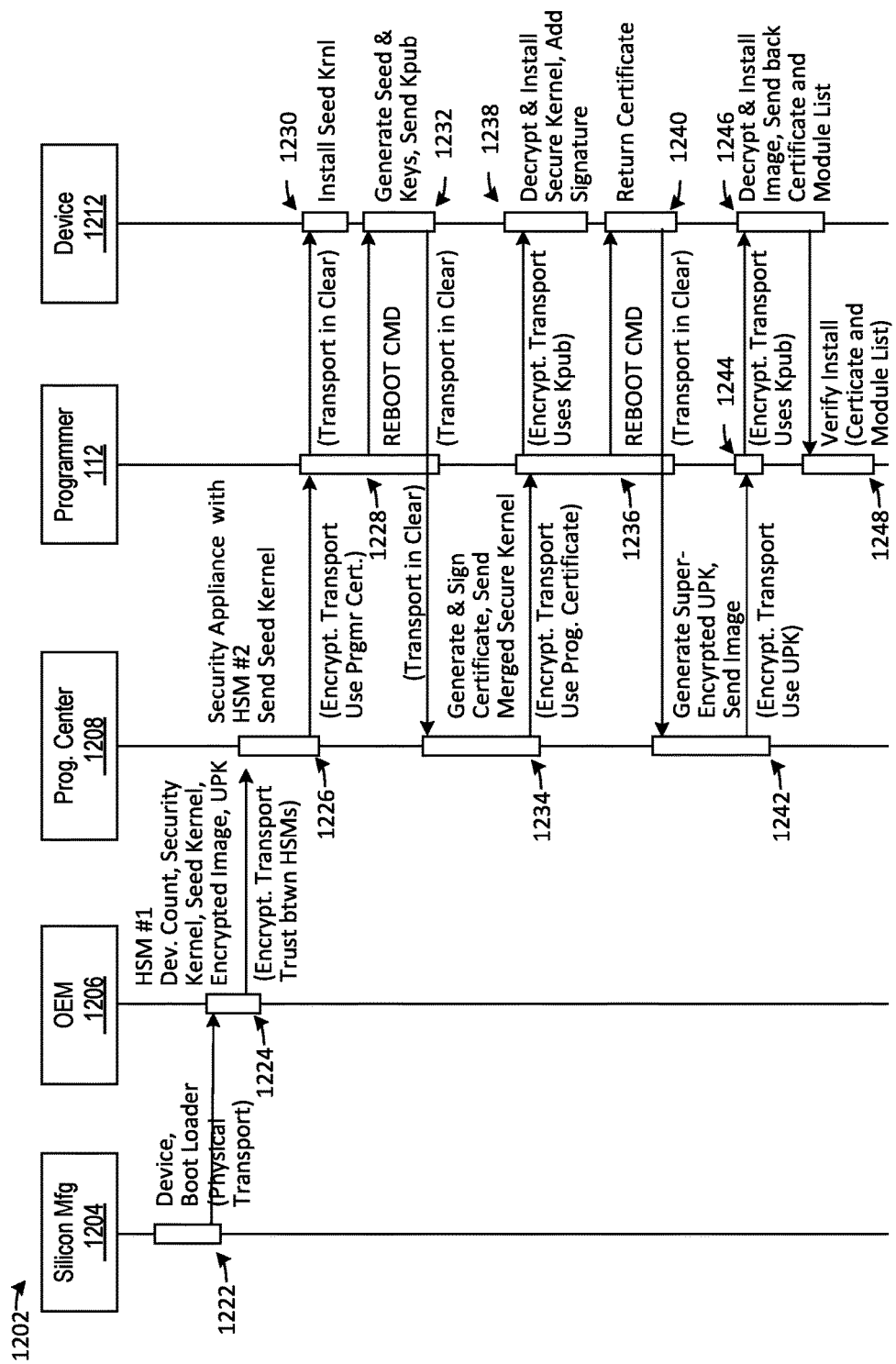
FIG. 12 is an example of an on-device seed and certificate generation use case.

Referring now to FIG. 12, therein is shown an example of an on-device use case 1202. The on-device seed use case 1202 can be performed in a hardware security module at an original equipment manufacturer location.

In the on-device seed and certificate generation use case 1202, the security elements can be instantiated and managed between several locations. The locations can include a variety of configurations. The locations can include a silicon manufacturer 1204, an original equipment manufacturer 1206, a programming center 1208, a manufacturing center, or similar location. Further, the use case can include data and actions embedded at the programmer 112 level and the device level 1212.

In a step 1222, the blank programmable devices 128 and the reference boot loader software can be provided to the microcontroller unit silicon vendor and physically transported to the second location, such as the OEM 1206, for further processing. The physical transport is a secure physical transport to prevent unauthorized access to the blank programmable devices 128 and the security software.

In a step 1224, the programmable devices 128 can be received at the second location, such as an OEM. The OEM can develop the security kernel and a security bootloader by modifying the reference boot loader software. The OEM can also develop and provide the encrypted firmware image and the firmware encryption key (UPK). The OEM can also provide a total count of the devices that need to be produced. The security kernel and the seed kernel can be kept in a first hardware security module (HSM #1) appliance at the OEM and can be provided to the programming center via encrypted transport into an on premise second hardware security module security appliance (HSM #2).

In a step 1226, the second hardware security module of a security appliance can send the seed kernel to the programmer 112. The seed is generated on the HSM#2 of the device. The seed kernel needs to be programmed into the device which will execute on-device to generate the seed and key pairs. The public key will go into the device certificates and private key can be programmed into the devices.

Step 1226 can send the seed kernel to the programmer 112 which will program the seed kernel into the device. The device is then re-booted and the seed kernel is executed. They seed kernel can then generate the key pairs. The private keys are stored in hidden memory area on the device. The public keys (Kpub) are returned back to the HSM #2. The HSM#2 can also generate signed certificates, merge them with the security kernel, and program it into the device.

This use case is the most secure use case because the device secret, the seed kernel, and the subsequent private keys are generated in the HSM#2 and are never exposed outside the device. The public keys can be send and exposed outside the device. Thus, the data exchange between the programmer 112 and the device is secure and minimizes security vulnerabilities even though some data is exchanged in the clear. This is different from the off-device seed use case 1102 where the security kernel and seed programming are transferred between the programmer and device in clear. This can potentially be a security breach if the data is intercepted and requires stricter premise security requirements.

In a step 1228, the programmer 112 can program the trusted devices 128 with the programmable payload P and then lock the device from any modification of the programmable payload. The private keys of the key pairs do not need to be programmed into the device because the device can use the seed to generate the private keys on demand at any time on the device. This generation of the private key is part of the security kernel and can only be securely accessed through security kernel.

In a step 1230, one of the programmable devices 128 can be programmed with the seed kernel. After the seed kernel has be installed, the step 1228 can continue and the programmer can issue a reboot command to the device.

In step 1232, the device can generate the device seed and security keys 106 and then generate and send the public key to the programming center level, such as the MES. The public key can be sent in the clear because the public key can be shared and is not a hidden value.

In a step 1234, the system can generate and sign the device certificate. Then the secure kernel can be merged with the device certificate and sent to the programmer 112. The merged secure kernel is sent using encrypted transport using the programmer certificate.

In a step 1236, the programmer 112 can receive the secure kernel and provision one of the secure devices 128 with the secure kernel. The secure kernel can be sent to one of the programmable devices 128 using an encrypted transport channel using the public key.

In a step 1238, the device can decrypt and install the secure kernel. In addition, the signature can be added to the device. After the secure kernel has been installed, step 1236 can sent a reboot command to the device and the device can return the certificate in a step 1240.

In a step 1242, the security appliance uses the public data encryption key from the device certificate of the device to generate the device specific super encrypted UPK. The super encrypted key and the encrypted firmware image can then be sent back to the programmer 112 for programming into one of the programmable devices 128.

In a step 1244, the encrypted file can be programmed into one of the programmable devices 128. The encrypted file can be transferred to one of the programmable devices 128 as an encrypted file using the public key.

In a step 1246, the programmer 112 can transfer the encrypted file to one of the programmable devices 128 where the image is decrypted and installed in one of the programmable devices 128. The installation of the image is qualified and verified by sending back the certificate and the module list to the programmer 112.

In a step 1248, the programmer 112 can verify the installation of the encrypted file on the programmable devices by matching the certificate and module list to a list of known certificates and modules.

Generating the device seed in the second hardware security module at the programming center increases the overall level of manufacturing security by reducing the number of opportunities for leaking the security elements. Because the programming center is a controlled environment with 24-hour a day video surveillance, the programmable devices 128 can be programmed with a higher degree of security and integrity.

3.0. Functional Overview

The secure programming system 100 can configure and provision the secure elements, such as the programmable devices 128 and the trusted devices 130, in a variety of ways. Different levels of security can be implemented depending on the type of operations that are performed on the secure elements. Different use cases and processes flows can be implemented on the same physical systems to accommodate the needs of different end users.

Figure 13:
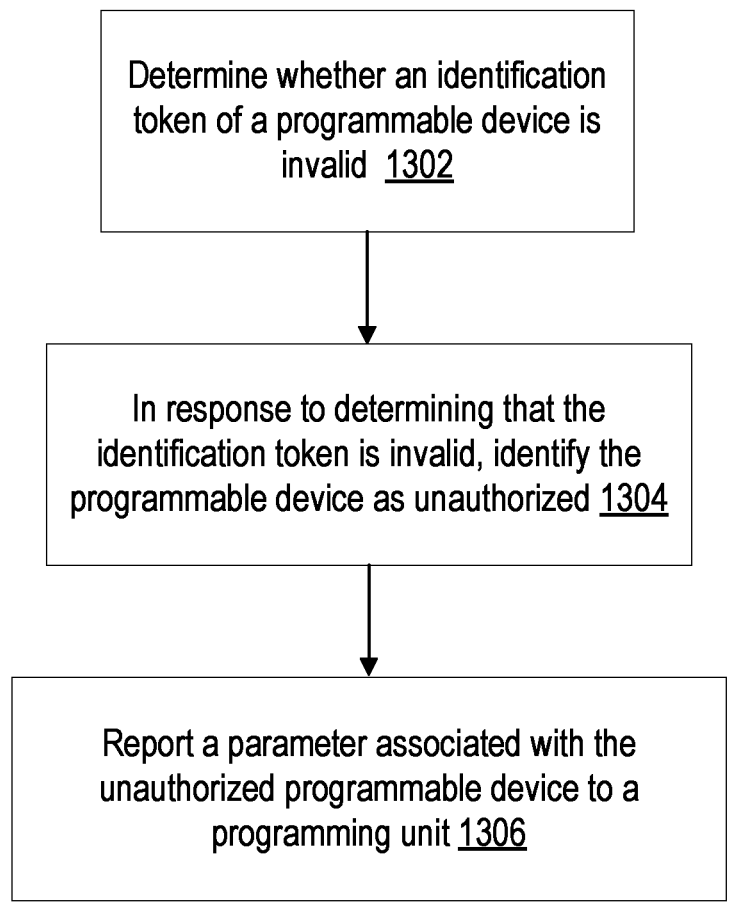
FIG. 13 is a first example process flow for counterfeit prevention, in accordance with one or more embodiments.

Referring now to FIG. 13, therein is shown a first example process flow for counterfeit prevention, in accordance with one or more embodiments. In some embodiments, a system (e.g., 100) is performed through one or more computing devices or units.

In block 1302, the system determines whether an identification token of a programmable device is invalid. A counterfeit detection module (e.g., 804) may be used for determining whether the identification token of the programmable device is invalid.

In block 1304, in response to determining that the identification token is invalid, the system identifies the programmable device as unauthorized. A counterfeit countermeasure module (e.g., 806) may be used for identifying that the programmable device is unauthorized.

In block 1306, the system reports a parameter associated with the unauthorized programmable device to a programming unit. A counterfeit report module (e.g., 808) may be used to report the parameter associated with the unauthorized programmable device.

Figure 14:
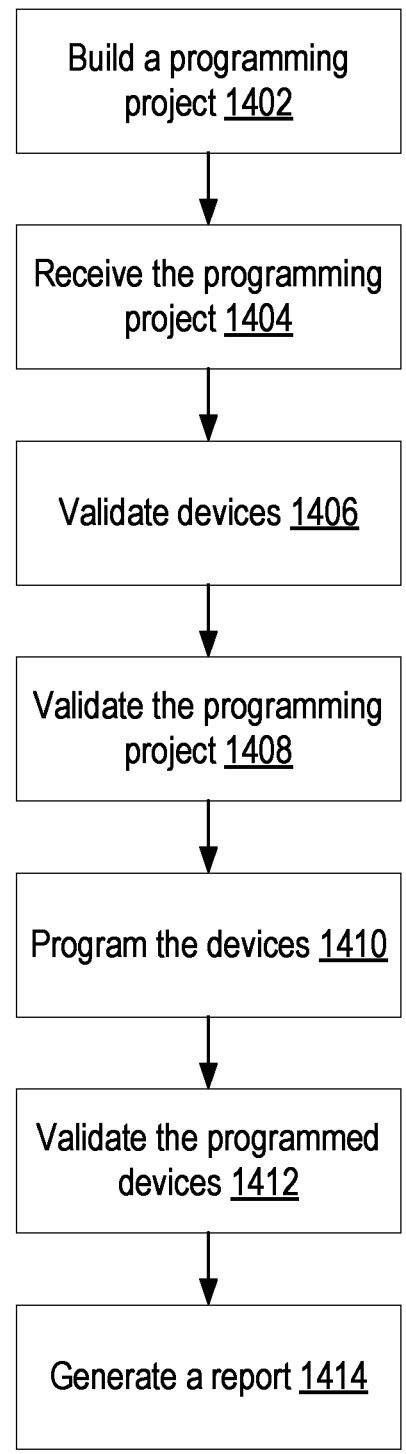
FIG. 14 is a second example process flow for counterfeit prevention, in accordance with one or more embodiments.

Referring now to FIG. 14, therein is shown a second example process flow for counterfeit prevention, in accordance with one or more embodiments. In some embodiments, a system (e.g., 100) is performed through one or more computing devices or units.

In block 1402, the system builds a programming project (e.g., 944). An OEM prepares the programming project at an OEM development premise (e.g., 940). The programming project includes information for configuring a set of secure devices, such as programmable devices (e.g., 128), secure elements, trusted devices (e.g., 130), or other similar devices.

For example, an OEM user (e.g., 1006) can create the programming project having at least an SV device authentication public key, an OEM device certificate signature key, and an OEM device certificate template (e.g., 950). The OEM device certificate signature key can be created in an OEM management system (e.g., 924) or imported from an external security system, such as an external HSM.

The OEM management system binds the programming project to a specific security programming system at a factory premise (e.g., 942). The programming project includes a system identification (e.g., 814) of a programming system or subsystem, such as a secure programming system (e.g., 100), a programming unit (e.g., 110), a programmer (e.g., 112), or a combination thereof.

The OEM management system binds an OEM Security Boot Loader (e.g., 906), firmware images (e.g., 914), an OEM certificate (e.g., 951), OEM key materials (e.g., 904), and a production count (e.g., 948) to the programming project. Once the programming project is initially created, the programming project is updated to include references, code, and data of the OEM security boot loader, the firmware images, the OEM key materials, the OEM certificate, and the production count.

The programming project includes information about the programmable devices. The programming project includes a device identification (e.g., 302) of each of the programmable devices that are to be programmed. For example, the device identification includes an incoming root of trust (e.g., 504), serial number markers (e.g., 512), firmware markers (e.g., 506), manufacturing markers (e.g., 510), product markers (e.g., 508), operating markers (e.g., 514), OEM markers (e.g., 516), and key pairs (e.g., 150).

In block 1404, the system receives the programming project at a programming system. The programming project is securely transferred to the factory premise to control the programming of the programmable devices. The programmer receiving the programming project uses the production count to limit a number of the programmable devices programmed and provisioned to prevent unauthorized production of the programmable devices.

In block 1406, the system validates or authenticates the programmable devices. For example, the programmable devices can be raw chips or integrated circuits without any programmed information, such as secure data, user data, or any other configuration information. Also, for example, the programmable devices can be a circuit board or an electronic device.

A counterfeit detection module (e.g., 804) is used to validate the programmable devices. The counterfeit detection module uses an identification module (e.g., 316), an authentication module (e.g., 320), a cryptography module (e.g., 318), and a code signing module (e.g., 322), or a combination thereof to perform a validation.

The counterfeit detection module validates the programmable devices using the device identification. The counterfeit detection module validates the device identification by comparing the device identification to a list of known or predefined devices, against a checksum, using a computational algorithm, or similar techniques.

The counterfeit detection module also validates a silicon vendor (SV) of the programmable devices, the programmer to be used to program the programmable devices, or an OEM that prepares the actual programming and provisioning of the programmable devices. The SV vendor, the programmer, and the OEM can be validated using a programmer identification (e.g., 216), a silicon vendor identifier (e.g., 956), an OEM identifier (e.g., 966), respectively. Among other benefits, the validation performed by the counterfeit detection module prevents counterfeit raw chips or devices from being produced in manufacturing or used in a system.

In block 1408, the system validates or authenticates the programming project. The programming project is validated using the counterfeit detection module or a secure execution unit (e.g., 324) and a secure storage unit (e.g., 326) of the programmer. The programming project is validated by verifying the OEM certificate with the OEM identifier, an OEM public key (e.g., 962), and an OEM private key (e.g., 952). The programming project is validated by comparing the OEM identifier, the OEM public key, and the OEM private key to a list of known devices, compared against a checksum, compared using a computational algorithm, or similar techniques. Alternatively, the programming project is validated by comparing to a list of invalid or non-supported OEM identifiers, programmer identifiers, etc.

In block 1410, the system programs the programmable devices. The programmable devices can be programmed with the device identification, which includes the incoming root of trust, the manufacturing markers, and the serial number markers. The incoming root of trust includes the programmer identification.

The incoming root of trust includes information that have been programmed in the programmable devices prior to programming a secure object (e.g., 701) including, but is not limited to, a board (e.g., 712, 714, etc.). The previously programmed information has been programmed into an adapter (e.g., 122, 124, 126, etc.) for programming the programmable devices, the programmer, and the secure object.

In block 1412, the system validates or authenticates the programmed devices to make sure that the devices have not been compromised or switched during or after the devices are programmed, among other benefits. The programmed devices are validated using a counterfeit countermeasure module (e.g., 806) or the secure execution unit and the secure storage unit of the programmer.

In an embodiment, the programmed devices are validated using an anti-counterfeiting software. The anti-counterfeiting software is added to the programming project. The anti-counterfeiting software is identified using a firmware marker (e.g., 506). For example, the anti-counterfeiting software can write a unique identifier or pattern to the secure storage unit in an unauthorized programmable device (e.g., 128) to indicate that the unauthorized programmable device is unauthorized or has been tampered with or compromised as detected in block 1406. The unique identifier or pattern is detectable and recognizable and so may not be treated or interpreted as user data or payload. For example, the anti-counterfeiting software can clear or blank out the entire content of the unauthorized programmable device by writing zeroes (0's) to all physical addresses of the unauthorized programmable device's memories or storage units.

In an embodiment, the programmed devices that are validated as invalid are disabled. The programmed devices are disabled or flagged as invalid using a security boot loader (e.g., 918). The programmed devices are disabled by writing the unique identifier that indicates that the programmed devices are to be discarded or not usable. The unique identifier is not a content payload of program data and code. The unique identifier is used as invalidation data for determining that a programmed device is a counterfeit or a device that has compromised. The programmed devices are flagged as invalid by the counterfeit countermeasure module setting a counterfeit flag or register by writing a logic "1" to the counterfeit flag.

The security boot loader is included in the programming project that has been programmed into the programmed devices. At boot up or during an initialization of the programmed devices, the security boot loader checks for the counterfeit flag. When the programmed devices are invalidated or identified as unauthorized, the programmed devices are recognized by the code that may have been installed or programmed in the programmed devices before the programmed devices are tampered or compromised. As such, the code would not execute.

In block 1414, the system generates a report. The report is sent to a database or a priori storage implemented using, but is not limited to, any of: the secure storage unit, any protected storage units in the programmer, the security modules of the secure programming system, a security master system (e.g., 104), etc. The report is also sent to an operator or an administrator of the programmer. The report is also sent to an OEM cloud (e.g., 928).

In an embodiment, validation of a blank device (e.g., 128) can be performed. In this case, the silicon vendor does not program any cryptographic identity or the silicon vendor identifier into the device during Silicon manufacture but does inject the silicon vendor identifier and a device serial number of the device into the device. The silicon vendor identifier and the device serial number are the incoming root of trust. In this case, the validation is limited to reading the silicon vendor identifier and the device serial number from device and validating them against an input data set including, but is not limited to an authorized silicon vendor identification (ID) and a range of authorized device serial numbers, to validate if the device is an authentic or authorized device.

In an embodiment, validation of a security provisioned device (e.g., 128) can be performed. In this case, the silicon vendor programs a device identity or serial number (e.g., 512) of the device during silicon manufacturing of the device. For example, this programming is done by injecting a key pair (e.g., 150) and a public device certificate (e.g., 926) into the device during silicon manufacture of the device. To validate the device, the programmer can read the device certificate from the device and authenticate the device certificate.

For example, the programmer can authenticate that the device certificate is a genuine silicon vendor (SV) certificate by checking that the device certificate is signed by the SV. The device certificate can be authenticated by the programmer using a SV device authentication public key (e.g., 154) injected as part of a definition of a programming project (e.g., 944).

Also, for example, the programmer can authenticate that the public key in the device certificate of the SV is actually a public identity of the device. This is done using a challenge-response authentication, where the programmer sends a challenge to the device (e.g., a message encrypted with the public key of the device). The device responds with a decrypted message using its private key. If the programmer gets the correct decrypted message, then the public and private keys of the device are the correct key pair and thus the public key represents the correct public identity for that device. This scheme is used to validate the device cryptographically.

4.0. Example Embodiments

Examples of some embodiments are represented, without limitation, in the following clauses:

According to an embodiment, a system comprises: a detection module, implemented at least partially by hardware, that determines whether an identification token of a programmable device is invalid; a countermeasure module, implemented at least partially by hardware, in response to determining that the identification token is invalid, that identifies the programmable device as unauthorized; and a report module, implemented at least partially by hardware, that reports a parameter associated with the unauthorized programmable device to a programming unit.

In an embodiment, wherein the detection module determines whether the identification token of the programmable device is invalid by comparing a device identification of the programmable device to a list of predefined devices.

In an embodiment, wherein the detection module determines whether the identification token of the programmable device is invalid by verifying the device identification using a checksum of the device identification.

In an embodiment, wherein, in response to determining that the identification token is invalid, the countermeasure module writes a unique identifier to a secure storage in the unauthorized programmable device.

In an embodiment, wherein, in response to determining that the identification token is invalid, the countermeasure module disables the unauthorized programmable device by setting a counterfeit register in the unauthorized programmable device for preventing the unauthorized programmable device from operating after the unauthorized programmable device is booted up.

In an embodiment, wherein the parameter is an identification token of the unauthorized programmable device or a programmer identification of the programming unit, and the report module saves the identification token in a security master system or an original equipment manufacturer cloud for subsequent rejection of the unauthorized programmable device in a production environment.

In an embodiment, wherein the programmable device is an integrated circuit, a circuit board, or an electronic device.

According to an embodiment, a method comprises: determining whether an identification token of a programmable device is invalid; in response to determining that the identification token is invalid, identifying the programmable device as unauthorized; and reporting a parameter associated with the unauthorized programmable device to a programming unit.

In an embodiment, wherein determining whether the identification token of the programmable device is invalid includes comparing a device identification of the programmable device to a list of predefined devices.

In an embodiment, wherein determining whether the identification token of the programmable device is invalid includes verifying the device identification using a checksum of the device identification.

In an embodiment, wherein, in response to determining that the identification token is invalid, writing a unique identifier to a secure storage in the unauthorized programmable device.

In an embodiment, wherein, in response to determining that the identification token is invalid, disabling the unauthorized programmable device by setting a counterfeit register in the unauthorized programmable device for preventing the unauthorized programmable device from operating after the unauthorized programmable device is booted up.

In an embodiment, wherein the parameter is an identification token of the unauthorized programmable device or a programmer identification of the programming unit, and the identification token is saved in a security master system or an original equipment manufacturer cloud for subsequent rejection of the unauthorized programmable device in a production environment.

In an embodiment, wherein the programmable device is an integrated circuit, a circuit board, or an electronic device.

Other examples of these and other embodiments are found throughout this disclosure.

5.0. Implementation Mechanism-Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 15:
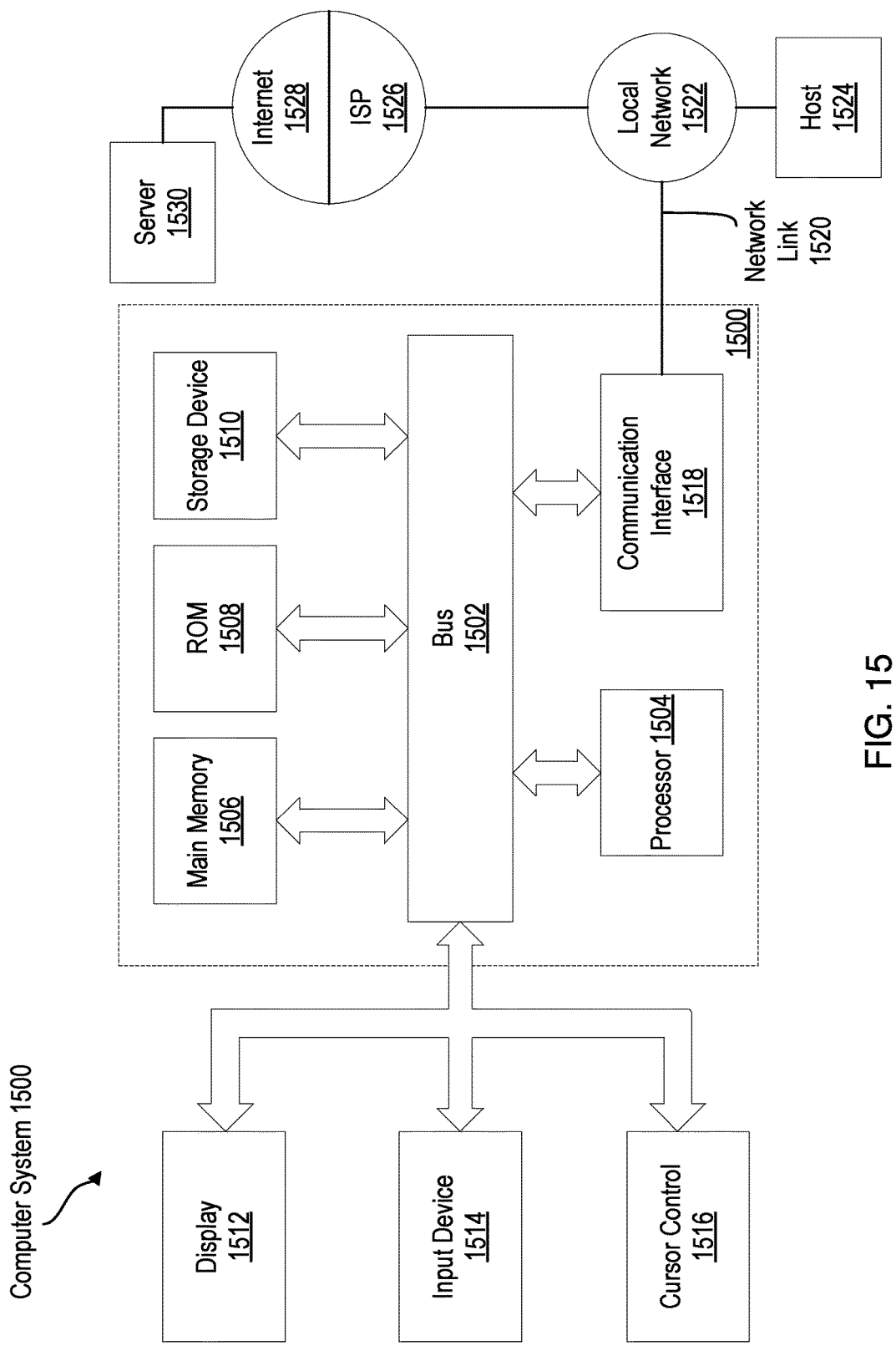
FIG. 15 is block diagram of a computer system upon which embodiments of the invention may be implemented.

Referring now to FIG. 15, therein is shown a block diagram that illustrates a computer system 1500 utilized in implementing the above-described techniques, according to an embodiment. Computer system 1500 may be, for example, a desktop computing device, laptop computing device, tablet, smartphone, server appliance, computing mainframe, multimedia device, handheld device, networking apparatus, or any other suitable device.

Computer system 1500 includes one or more busses 1502 or other communication mechanism for communicating information, and one or more hardware processors 1504 coupled with busses 1502 for processing information. Hardware processors 1504 may be, for example, a general purpose microprocessor. Busses 1502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1500 also includes a main memory 1506, such as a random access memory (RAM) or other dynamic or volatile storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes one or more read only memories (ROM) 1508 or other static storage devices coupled to bus 1502 for storing static information and instructions for processor 1504. One or more storage devices 1510, such as a solid-state drive (SSD), magnetic disk, optical disk, or other suitable non-volatile storage device, is provided and coupled to bus 1502 for storing information and instructions.

Computer system 1500 may be coupled via bus 1502 to one or more displays 1512 for presenting information to a computer user. For instance, computer system 1500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1512.

In an embodiment, output to display 1512 may be accelerated by one or more graphics processing unit (GPUs) in computer system 1500. A GPU may be, for example, a highly parallelized, multi-core floating point processing unit highly optimized to perform computing operations related to the display of graphics data, 3D data, and/or multimedia. In addition to computing image and/or video data directly for output to display 1512, a GPU may also be used to render imagery or other video data off-screen, and read that data back into a program for off-screen image processing with very high performance. Various other computing tasks may be off-loaded from the processor 1504 to the GPU.

One or more input devices 1514 are coupled to bus 1502 for communicating information and command selections to processor 1504. One example of an input device 1514 is a keyboard, including alphanumeric and other keys. Another type of user input device 1514 is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. Yet other examples of suitable input devices 1514 include a touch-screen panel affixed to a display 1512, cameras, microphones, accelerometers, motion detectors, and/or other sensors. In an embodiment, a network-based input device 1514 may be utilized. In such an embodiment, user input and/or other information or commands may be relayed via routers and/or switches on a Local Area Network (LAN) or other suitable shared network, or via a peer-to-peer network, from the input device 1514 to a network link 1520 on the computer system 1500.

A computer system 1500 may implement techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1500 can receive the data on the network and demodulate the signal to decode the transmitted instructions. Appropriate circuitry can then place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

A computer system 1500 may also include, in an embodiment, one or more communication interfaces 1518 coupled to bus 1502. A communication interface 1518 provides a data communication coupling, typically two-way, to a network link 1520 that is connected to a local network 1522. For example, a communication interface 1518 may be an integrated services digital network (ISDN) card, cable modem, satellite modem, or a modem to provide a data communication connection to a corresponding type of telephone line. As another example, the one or more communication interfaces 1518 may include a local area network (LAN) card to provide a data communication connection to a compatible LAN. As yet another example, the one or more communication interfaces 1518 may include a wireless network interface controller, such as an 802.11-based controller, Bluetooth controller, Long Term Evolution (LTE) modem, and/or other types of wireless interfaces. In any such implementation, communication interface 1518 sends and receives electrical, electromagnetic, or optical signals that carry digital data streams representing various types of information.

Network link 1520 typically provides data communication through one or more networks to other data devices. For example, network link 1520 may provide a connection through local network 1522 to a host computer 1524 or to data equipment operated by a Service Provider 1526. Service Provider 1526, which may for example be an Internet Service Provider (ISP), in turn provides data communication services through a wide area network, such as the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

In an embodiment, computer system 1500 can send messages and receive data, including program code and/or other types of instructions, through the network(s), network link 1520, and communication interface 1518. In the Internet example, a server 1530 might transmit a requested code for an application program through Internet 1528, ISP 1526, local network 1522 and communication interface 1518. The received code may be executed by hardware processors 1504 as it is received, and/or stored in storage device 1510, or other non-volatile storage for later execution. As another example, information received via a network link 1520 may be interpreted and/or processed by a software component of the computer system 1500, such as a web browser, application, or server, which in turn issues instructions based thereon to a hardware processor 1504, possibly via an operating system and/or other intermediate layers of software components.

In an embodiment, some or all of the systems described herein may be or comprise server computer systems, including one or more computer systems 1500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is an embodiment of the invention, and is intended by the applicants to be an embodiment of the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   a detection device, implemented at least partially by hardware, that determines a programmable device is unauthorized using information associated with the programmable device;
   a parameter reporting device, implemented at least partially by hardware, that determines a parameter associated with the unauthorized programmable device; and
   a programmer of a programming unit configured to write a unique invalidation identifier to a user data area of the unauthorized programmable device associated with the parameter, the unique invalidation identifier identifies the unauthorized programmable device as being unauthorized, the unique invalidation identifier is detectable and not treated as payload data.

2. The system as recited in claim 1, wherein the detection device determines that the programmable device is unauthorized by comparing a device identification of the programmable device to a list of predefined devices.

3. The system as recited in claim 1, wherein the detection device determines that the programmable device is unauthorized by verifying a device identification using a checksum of the device identification.

4. The system as recited in claim 1, wherein, in response to determining that the programmable device is unauthorized, the programmer sorts the unauthorized programmable device to a reject bin or physically destroys the unauthorized programmable device.

5. The system as recited in claim 1, wherein, in response to determining that the programmable device is unauthorized, a countermeasure module disables the unauthorized programmable device by setting a counterfeit register in the unauthorized programmable device for preventing the unauthorized programmable device from operating after the unauthorized programmable device is booted up.

6. The system as recited in claim 1, wherein the parameter is an identification token of the unauthorized programmable device or a programmer identification of the programming unit, and the programming unit saves the identification token in a security master system or an original equipment manufacturer cloud for subsequent rejection of the unauthorized programmable device in a production environment.

7. The system as recited in claim 1, wherein the programmable device is an integrated circuit, a circuit board, or an electronic device.

8. A method comprising:
   determining, by a programming unit, that a programmable device is unauthorized using information associated with the programmable device;
   in response to determining that the programmable device is an unauthorized programmable device:
      determining a parameter associated with the unauthorized programmable device; and
      writing a unique invalidation identifier to a user data area of the unauthorized programmable device associated with the parameter, the unique invalidation identifier identifies the unauthorized programmable device as being unauthorized, the unique invalidation identifier is detectable and not treated as payload data.

9. The method of claim 8, wherein determining that the programmable device is unauthorized includes comparing a device identification of the programmable device to a list of predefined devices.

10. The method of claim 8, wherein determining that the programmable device is unauthorized includes verifying a device identification using a checksum of the device identification.

11. The method of claim 8, wherein, in response to determining that the programmable device is unauthorized, sorting the unauthorized programmable device to a reject bin or physically destroying the unauthorized programmable device.

12. The method of claim 8, wherein, in response to determining that the programmable device is unauthorized, disabling the unauthorized programmable device by setting a counterfeit register in the unauthorized programmable device for preventing the unauthorized programmable device from operating after the unauthorized programmable device is booted up.

13. The method of claim 8, wherein the parameter is an identification token of the unauthorized programmable device or a programmer identification of the programming unit, and the identification token is saved in a security master system or an original equipment manufacturer cloud for subsequent rejection of the unauthorized programmable device in a production environment.

14. The method of claim 8, wherein the programmable device is an integrated circuit, a circuit board, or an electronic device.

15. One or more non-transitory computer-readable media storing instructions that, when executed by one or more computing devices, cause:
   determining, by a programming unit, that a programmable device is unauthorized using information associated with the programmable device;
   in response to determining that the programmable device is an unauthorized programmable device:
      determining a parameter associated with the unauthorized programmable device; and
      writing a unique invalidation identifier to a user data area of the unauthorized programmable device associated with the parameter, the unique invalidation identifier identifies the unauthorized programmable device as being unauthorized, the unique invalidation identifier is detectable and not treated as payload data.

16. The non-transitory computer-readable media of claim 15, wherein determining that the programmable device is unauthorized includes comparing a device identification of the programmable device to a list of predefined devices.

17. The non-transitory computer-readable media of claim 15, wherein determining that the programmable device is unauthorized includes verifying a device identification using a checksum of the device identification.

18. The non-transitory computer-readable media of claim 15, wherein, in response to determining that the programmable device is unauthorized, sorting the unauthorized programmable device to a reject bin or physically destroying the unauthorized programmable device.

19. The non-transitory computer-readable media of claim 15, wherein, in response to determining that the programmable device is unauthorized, disabling the unauthorized programmable device by setting a counterfeit register in the unauthorized programmable device for preventing the unauthorized programmable device from operating after the unauthorized programmable device is booted up.

20. The non-transitory computer-readable media of claim 15, wherein the parameter is an identification token of the unauthorized programmable device or a programmer identification of the programming unit, and the identification token is saved in a security master system or an original equipment manufacturer cloud for subsequent rejection of the unauthorized programmable device in a production environment.

* * * * *